United States Patent Office 3,545,909
Patented Dec. 8, 1970

3,545,909
POLYAMINOALKYLSILANES COLOR FIXATION AND ARTICLES SO COLORED
Domenick D. Gagliardi, East Greenwich, R.I., assignor to Union Carbide Corporation, a corporation of New York
No Drawing. Continuation-in-part of application Ser. No. 774,675, June 26, 1958. This application Apr. 8, 1959, Ser. No. 804,870
Int. Cl. D06m *15/66;* D06p *1/52*
U.S. Cl. 8—3                                        6 Claims This application constitutes a continuation-in-part replacement of my former copending application Serial No. 744,675 which was filed on June 26, 1958, and which has now been abandoned.

This invention relates, in general, to the chemistry of coloring and involves improvements in the dyeing, printing, and pigmenting, i.e., coloration by dyeing or printing with pigments, of a variety of substrate materials including substances of natural organic origin, as well as man-made materials from organic and inorganic sources. More particularly, the invention is concerned with both process and composition of matter improvements resulting, in part, from my discovery that aminoalkyl silicon compounds constitute a unique class of coloring assistants which can be used in conjunction with diverse coloring agents of the dyestuff and pigment types to impart improved coloring and ancillary properties to numerous substrate materials from among the classes enumerated above. In a more specific sense, the invention contemplates the provision of improved coloring processes and certain novel coloring compositions which are based on the unique color-affinity, for pigments of both natural and synthetic origin as well as anionic dyestuffs, or dyestuffs which are rendered anionic in use, that can be imparted— through pretreatment with, and/or concurrent use within the coloring media of aminoalkyl silicon compounds—to solid and fibrous substrata including, among others:

(1) Materials of normally good substantivity or affinity for conventional coloring agents, such as natural fibrous substrata derived from animal and vegetable fibers including silk, wool, cotton, hemp, jute, etc., and semisynthetic fibers from natural raw materials such as the rayons, casein fibers, etc.; whereby enhanced use of at least some of the existing coloring agents for these materials can be realized, as well as wider use of certain other coloring agents which have heretofore found only limited acceptance in connection with the coloring of these substrata as, for example, pigment dyes and the like; and (2) Normally difficultly colorable substrata, including, (A) natural fibrous materials such as leather and asbestos fibers; (B) natural solid substrata including inorganic oxides in pulverant or laminate forms such as silica, titanium dioxide, quartz, mica, diatomaceous earth, siliceous sands and gravels, etc., and metallic substrata containing similar spontaneously-formed insoluble oxide surface layers; (C) semisynthetic fibrous materials including glass fibers and aluminum silicate fibers; (D) synthetic fibrous substrata, monofilaments and continuous yarns from fibers such as the synthetic linear polyamides polyacrylonitriles, polyacrylonitriles modified with vinyl acetate, copolymers of acrylonitrile and vinyl chloride, copolymers of vinyl chloride and vinyl acetate, polymers of tetrafluoroethylene, the polyester fibers and polyethylene fibers; and (E) mixed or blended fibrous substrata produced by spinning combinations of selected natural, semisynthetic and synthetic fibers from among the above-enumerated fibrous materials including, for example, polyacrylonitrile-wool, synthetic linear polyamide-wool, polyacrylonitrile-rayon, viscose rayon-acrylonitrile and vinyl chloride polymer, polyester-cotton, polyester-synthetic linear polyamide, etc., (see Fieser and Fieser's Organic Chemistry [3rd Ed.], New York, Reinhold Publishing Corporation [1956] pp. 857–862 for more detailed information relating to the synthetic fibers hereinbefore discussed); whereby enhanced coloration of such substrata can be effected by relatively simple techniques and through use of a great variety of coloring agents which are presently viewed as being substantially non-substantive or non-affinitative towards these materials.

Quite naturally, the process and compositions of the invention find their most significant applications in the coloring of substrate materials which are classified under group (2) above, namely those materials which are most difficultly colorable from the standpoint of presently known techniques. Among this group of materials, it may be said that the greatest demand for improvement from the standpoint of both necessity and potential use exists with respect to the materials of subgroups (C), (D) and (E), and notably, (I) fibrous glass products from among the known materials of subgroup (C), (II) virtually all of the fully synthetic linear polymeric and copolymeric organic fibers of subgroup (D) whose hydrophobic nature is perhaps their most pronounced characteristic and one of the greatest annoyance to the dyer and finisher; and (III) the commonly produced textile blends of synthetic fibers with both natural and other man-made fibers of subgroup (E). Accordingly, the major portion of the technological data presented hereinafter has been directed to the specific applications of the unique coloring assistants of my invention to the coloring of these "problem" substrata.

Significantly, glass fiber products including cloth, mat, roving, yarn, and chopped strands as employed for reinforcing applications, represent the most difficultly colorable materials in use today by the textile and allied industries. That is to say, there are no known coloring agents which exhibit natural affinity towards these materials, but existing coloring techniques are largely based on the use of vairous types of coloring assistants including protein-type sizes, or resin-bonded pigments. By far the greatest percentage of colored glass fabrics manufactured today are colored by use of print pastes incorporating water- or oil-dispersible pigment colors in combination with water- or oil-soluble synthetic resinous bonding agents. Of course, the coloring effects obtainable under these conditions are relatively limited, whereas the processing costs are substantially higher than those encountered in competitive textile fields.

In contrast to the foregoing, I have found that it is entirely possible to dye and print fiber glass textiles and similar fiber glass substrata wtih most of the conventional textile dyestuffs now in use, as well as certain newer types of textile dyestuffs, such as the so-called "cellulose fiber reactive" dyes, and to effect similar coloration of such substrata through use of organic and inorganic pigments, either by suitably pretreating the fiber glass with an aminoalkyl silicone coloring assistant, or by the simultaneous application of the dyestuff or pigment and aminoalkyl silicone to the fiber glass from suitable aqueous solutions, dispersions or emulsions, depending on the particular solubility characteristics of the coloring agent and coloring assistant employed. Even more surprising is the fact that these effects can be produced by use of normal plant dyeing and printing equipment, and that no highly unstable compounds, drastic conditions of reaction, or unorthodox solvents are required.

In the field of synthetic organic fibers, the most notable recent advance in coloring techniques is that of pressure dyeing which permits the application of temperatures above the boiling point of water by simply placing the entire dyeing system under pressure, thereby aiding in diffusing the dyes into the fibers, and permitting the production of deeper shades over shorter dyeing cycles. This technique is inherently expensive, however, since it requires the use of special equipment such as pressure vessels and related control apparatus. Other recently proposed dyeing processes for the synthetic organic fibers have advocated use of various solvent systems either with or without an aqueous medium, special cationic dyestuffs, metallic complexes, and the application of ultrasonic waves. Most of these proposals have met with only limited acceptance, however, for the simple reason that they are not directly amendable to existing shop installations and practices.

The problems of the dyer have been further aggravated by the fact that the majority of the synthetic organic fibers are used in blends with natural fibers. The extreme hydrophobic nature of the synthetic components of such blends renders many of the established textile auxiliaries less useful or entirely useless, since they were developed for, and intended for use on natural fibrous substrata within aqueous processing systems. Continued research on this problem has resulted in the development of a great many new auxiliaries or coloring assistants, but these advances have been largely restricted to specialty items, and many are limited to use in connection with the synthetic fiber products of a particular manufacturer. Seemingly, the best indication of the current status of technology with respect to the coloring of synthetics and blended textiles containing synthetic components, may be had by reference to the great many new polymeric and copolymeric fibers which are under development by industry in a continuing effort to produce more readily colorable materials, among other sought-after properties.

In their application to the coloring of the hydrophobic synthetic fibres, the processing techniques of my invention may be employed to promote increased affinity of a particular type of fiber towards a conventional anionic dyestuff applied under presently practiced operating conditions, whereby increased depth of color, or brilliance, or shorter dyeing times can be achieved, for example, or, the aminoalkyl silicone coloring assistants may be employed to render an otherwise normally non-affinitative fiber amenable to coloration with a selected dyestuff or pigment under conditions usually encountered in the application of the dyestuff or pigment to regular textile substrata. For example, a dispersion or emulsion of a water-insoluble pigment and an aminoalkyl silicone can be applied by conventional pigment printing or dyeing techniques to achieve uniform levelling with blended textiles containing natural and synthetic fibers, or, a cellulose fiber-reactive dyestuff, which normally has absolutely no affinity towards the synthetic fibers, can be employed to produce excellent shades of fast colors by reaction of the dyestuff with the synthetic substrate following a suitable preliminary treatment of the same with an aminoalkyl silicone, or by the simultaneous application of the dyestuff and aminoalkyl silicone from aqueous solutions. Alternatively, the aminoalkyl silicone coloring assistants may be employed to effect spin-dyeing of the synthetic fibers, or they may be incorporated directly into a polymeric spinning mixture to introduce dyeable sites into the fiber during the actual printing operation.

The processes of the invention may be employed, also, to effect coloration of normally difficult colorable inorganic oxides and similar inorganic substrata, other than glass fibers by the application thereto of standard textile dyes and pigment colors. Thus, apart from the direct utility for colored substrata of this category as filler materials and the like, it becomes possible to apply conventional organic dyestuffs to white inorganic water-insoluble pigments such as titanium dioxide, silica, calcium carbonate, alumina, aluminum silicate, etc., to produce relatively inexpensive colored pigments, wherein the major portion of the weight of the pigment is constituted by a low-cost inorganic oxide with minor proportions consisting of an aminoalkyl silicone and an organic textile-type dyestuff. Synthetic pigments of this type find direct utility in textile printing and dyeing applications, or as coloring agents in paints, enamels and printing inks, and as colored fillers for plastics and rubbers. Naturally, such organic-modified materials are more compatible with the synthetic rubbers and plastics than are the inorganic fillers, and serve to promote improved adhesion, reduction in mixing times, etc. Analogous aminoalkyl silicone-dyeing procedures can be carried out with inorganic substrata of larger particle sizes such as clays, sands, gravels, and cements for structural uses or for novelty products. In addition, the processes of the invention may be employed to effect coloration of metallic substrata such as tin, iron, aluminum, zinc, manganese, titanium, chromium, etc., apparently by reason of the similar insoluble oxidic surface coatings which form spontaneously on these elemental metallic materials.

As stated hereinbefore, the aminoalkyl silicon coloring assistants may be applied in the form of a pre-treatment to condition the desired substrate for a subsequent coloring operation, i.e., to introduce dyeable sites onto a normally non-affinitative material, or they may be used to promote dyeability of a substrate from direct admixture with the coloring agent during the normal dyeing or printing operation. The actual choice of procedures in this connection will depend upon a number of factors peculiar to existing plant installations and conventions, and to the particular characteristics of the coloring agent, coloring assistant and substrate involved, including, for example, the mutual solubility characteristics of the coloring agent, and coloring assistant, the physical nature and form of the substrate to be colored, the recommended processing techniques normally required for most efficient utilization of the dyestuff or pigment, and the pressure or absence of auxiliaries such as levelling agents or coloring catalysts within the coloring medium, among other factors. While most coloring operations can be suitably modified to permit either type of treatment, it is found that one method will usually be superior to the other for each class of coloring agents, substrata, etc. For example, in effecting coloration of fiberglass substrata through use of conventional textile dyestuffs, I find it to be most convenient to apply the aminoalkyl silicon dye assistant to the fiber glass in advance of the actual dyeing process, although good affinity for most dyestuffs of this type can also be obtained by use of the combined treatment. On the other hand, in the application of insoluble pigment colors for dyeing or printing the same type of substrate, it is most convenient to apply the coloring assistant during the dyeing or printing operation from a conventional pigment dispersion or emulsion.

In actual practice of my invention when treating substrate materials with the aminoalkyl silicon coloring assistants prior to the coloring process, it is highly desirable, from an economical and practical standpoint, to effect treatment of the substrate material by a simple immersion operation within a suitable aqueous solution of the aminoalkyl silicone, but it is entirely possible, and practical, to accomplish the requisite loading by spraying or padding techniques or by any other means normally employed in industry. If necessary or desirable, the aminoalkyl silicone can be solubilized beyond its normal solubility in pure aqueous solutions through use of acid, neutral or alkaline solutions, or emulsions of the coloring assistants can be employed with entirely satisfactory results. Enhanced solubilization of the aminoalkyl silicone coloring assistants may also be effected by salt formation, or by direct chemical modification of the base compounds to introduce solubilizing groups, such as by hydroxy ethylation, and the like. The use of solvent systems is particularly desirable when dealing with substrate materials of the highly hydrophobic type in order to avoid "ring-dyed" effects. In point of fact, virtually any solvent system which is substantially non-reactive with the aminoalkyl silicones can be employed to promote more uniform distribution or dispersion of the coloring assistant onto the substrate material. In addition, most of the commercially available wetting agents normally used within the coloring industries can be employed to further promote enhanced dispersion of the silicones.

Among the specific solvents which have been employed with success are included the aliphatic oxygen-containing compounds such as the alkanols and the ether alcohols, such as ethanol, propanol, isopropanol, methoxyethanol, ethoxyethanol, and the like. In addition, monobasic acids such as formic, acetic and propionic acids are excellent solubilizing agents for the aminoalkyl silicones. Included as monobasic acids, such as, lactic acid, gluconic acid, glycolic acid, other hydroxy carboxylic acids are suitable for use as solubilizing agents and provide improved fixing properties. Other carboxylic acids, such as, diglycolic acid, can also be used. Mineral acids may also be employed, as may the standard aromatic hydrocarbon solvents such as benzene, toluene, xylene and the like, but these solubilizing agents are not as preferred for general use as are the simple aqueous systems or the aqueous-alcoholic and monobasic acid-modified aqueous solvent systems. Lastly, the coloring assistants may also be deposited from aqueous alkaline solution. In actual practice, I have found that an aqueous system comprised of from about 40 to 60 parts water and from about 40 to 60 parts of an organic alcohol such as ethanol or isopropanol, and containing approximately five percent (5%) by volume of a monobasic acid such as acetic acid, provides an excellent medium for solubilizing and dispersing the aminoalkyl silicone coloring assistants onto virtually any substrate material from among the general class described hereinbefore.

The concentration of the aminoalkyl silicone coloring assistants contained within pre-treatment solutions of the foregoing type is found to be relatively non-critical from the stand-point of establishing dyeable sites on the various substrata, including even the most difficulty colorable materials such as fiberglass. Thus, for example, as established by the experimental data presented hereinafter, an increase in solution concentration of from 3 to 9 percent by weight of aminoalkyl silicone solids, representing an increase of from approximately 0.75 to 2.25 percent by weight of the silicone solids actually deposited from the solutions onto a glass cloth substrate, produced little or no change in the coloring effects realized when the glass cloths were subsequently subjected to dyeing operations with various types of conventional textile dyes. In general, I have found that solution concentrations of the aminoalkyl silicone solids ranging from approximately one percent to five percent (1–5%) by weight, are adequate for most coloring applications, assuming, for example, that the percentage wet pick-up on the substrata prior to drying will be within the range of from approximately 10 to 60 percent; depending, of course, on the relative hydrophobic or hydrophilic nature of the various substrate materials. Thus, assuming conditions of minimal wet pick-up at a solution concentration of 5.0 percent, the deposited solids would be of the order of 0.5 percent, whereas under conditions of maximum wet pick-up and a solids concentratiton in solution of 1.0 percent, the deposited solids would be of an equivalent magnitude. By suitably adjusting the solution concentrations in accordance with the wet pick-up characteristics for a particular substrate undergoing treatment, it is relatively simple to adjust the pre-treatment solution to an opimum concentratiton for the coloring agent employed. In a similar manner, the concentration of the aminoalkyl silicones can be varied to produce variations in depth of shade and the like. In printing applications, owing to the fact that the concentration of dyestuff as applied to the subsrate is many times higher than the average concentration of the dyestuff used in dyeing, it is usually possible to employ extremely dilute concentrations of the aminoalkyl silicone coloring assistants in the pre-treatment of substrate materials intended for printing. These factors are well known to experienced dyers and finishers who must adjust the relative concentratitons of most known auxiliaries and coloring assistants to meet the exigencies of many varied dyeing and printing applications, and, accordingly, it is not believed to be necessary to comment further on such variables for purposes of this disclosure.

In the single-bath type of treatment, i.e., the simultaneous application of the aminoalkyl silicone coloring assistant and coloring agent to substrate materials, whether from dye baths, emulsions, or dispersions of insoluble coloring agents of the type of pigment colors and vat dyes, the concentration of the coloring assistant is controlled in much the same manner as for the pretreatment process described above. Thus, the relative concentration of coloring assistant within the particular coloring medium employed is adjusted to provide for deposition on the substrate of a predetermined percentage of silicone solids during the dyeing or printing cycle. In general, the deposition of a solids concentration within the range of from approximately 0.25 percent to approximately 3.0 percent will insure adequate colorability of all of the various substrate materials by the different coloring agents which can be employed in the practice of the invention.

In the application of the pre-treatment method for utilizing the coloring assistants of the invention, it is desirable to effect forced drying of the aminoalkyl silicone deposits by heating the substrate material at an elevated temperature after it has been removed from the treatment soluion, or otherwise processed to deposit the desired coloring assistant thereon, although simple air-dried substrata have also been colored to produce solid shades of good permanence. It is believed that such drying of the treated substrata at elevated temperatures effectively "cures" the deposited silicone to the substrate, or, more concisely, the deposit is fixed or bonded to the substrate by the heating operation. In this connection, it should be stated that the exact mechanism or mechanisms of the coloring phenomena of my invention are not known, although certain postulations and theories on these effects are advanced hereinafter; nor is the nature of the substrate-silicone reaction, if any, on deposition and curing, entirely understood. It is assumed, however, that the mechanism involves something more than simple surface coating, and that at least limited penetration, absorption, or "depth of reaction," so to speak, occurs between the substrata and coloring assistants. This is evidenced, for example, by the fact that in subsequent coloring operations with synthetic fibrous materials of the types described, some penetration of the fibers by the relatively large dye molecules takes place, since evidence of simple ring-dyeing cannot be detected upon subsequent examination of the fibers, but rather, relatively good distribution of the dyestuff across the fibers is effected under most conditions of operation. For this reason, it is to be understood that the references to "deposits" or "coatings" or "applications" as used herein and in the appended claims, having reference to the substrate-silicone systems, are not to be construed as limitations to a simple surface phenomenon.

Drying and curing of the aminoalkyl silicone deposits can be effected at room temperature over protracted periods or by heating the pre-treated substrate materials at higher temperatures for relatively shorter periods of time. Actually, time and temperature are inversely related in the curing mechanism, such that it is entirely possible to effect "flash" cures within a matter of seconds, provided the particular substrate material will withstand the higher temperatures required for such cures. In actual practice, however, I prefer to operate at curing temperatures within the range of from 200–350° F., over periods ranging anywhere from a few minutes to one-half hour for substrate materials of pronounced hydrophobicity, whereas proportionately longer drying and curing cycles may be required for the more hydrophilic substrates, and particularly substrata of the pulverulent or finely-divided types, such as organic oxides and the like. In effecting drying of the latter forms of substrate materials, it is usually advantageous to employ a fluid-bed type drier or an equivalent unit capable of preventing undue caking of the materials. When the single-bath type of treatment is practiced, the necessary drying and curing operations are usually effected as an incident to the heating cycles required for the normal dyeing or printing processes, but the heat treatment can be practiced as a separate step following a normal dyeing or printing process.

The coloring agents which can be employed in the practice of my invention include the organic and inorganic pigments, and dyestuffs of the anionic type, i.e., dyes which contain an acidic substituent, or their neutralized equivalents, as well as such dyes containing metal in complex union, and dyes having substrate-reactive groups such as halogen atoms; as distinguished from basic or cationic dyestuffs which contain amino groups and the so-called "dispersed dyes" which are largely insoluble aminoazo or hydroxazo derivatives. The term "anionic dyestuffs' 'is intended to include those dyestuffs which are customarily rendered anionic in use, as, for example, vat dyestuffs which become anionic when reduced during the dyeing proces, and similar "functionally anionic" dyestuffs which might be supplied in a neutralized form for eventual conversion during use. Specific classes of anionic dyestuffs which I have successfully employed for deep dyeing and printing operations in conjunction with the aminoalkyl silicone coloring assistants include, indigoid vats, anthraquinone vats, soluble vat esters, vat acids, direct azo, sulfur dyes, acid wool dyes, premetallized acid, premetallized neutral, direct and developed dyes, naphthols, and cellulose fiber-reactive dyes. Virtually all organic and inorganic pigments can be empoyed in the practice of my process including, both natural and synthetic inorganic pigments of the types of umber, sienna, ochre, aluminum, etc., and chrome greens, iron blues, iron oxide browns and reds, zinc whites, titanium whites, ultramarine blue, lead chromate yellows, zinc chromate yellows, cadmium reds, carbon blacks, etc.; and natural and synthetic organic pigments of the types of carmine, catechu, tumeric, fustic, logwood, etc., and naphthol yellows, azo reds, lithol reds, azo oranges, indanthrene blues, indanthrene violets, toluidene yellows, phthalocyanine blues, etc. In addition to these conventional pigment colors, I may also employ synthetic pigments produced in acordance with the principles of my invention by use of normal textile dyestuffs on finely-divided inorganic oxide materials such as silica, titanium dioxide, zinc oxide, etc., as explained hereinbefore.

Of course, it is not suggested that the aminoalkyl silicone coloring assistants render all of the various dyestuffs and pigments full equivalents for coloring the various substrata defined hereinbefore, but rather, in the selection of a dyestuff or pigment for a specific coloring application, advantage should be taken of any natural affinity which a particular coloring agent might possess towards a given substrate. Thus, whereas early researchers tended to regard each dyeing theory to be comprehensive and applicable to all fibers, it is now considered axiomatic that this cannot be so, except in a very general sense, but that the precise mechanism of dyeing will vary with the dye and fiber and the respective reactive groups which they contain. For example, in the dyeing of the hydrophobic synthetic fibers such as the polyamides in accordance with the processing techniques of my invention, advantage can be taken of the limited natural affinity for these fibers as exhibited by the acid wool dyes or the naphthols, whereas selected premetallized dyes may be utilized for union dyeing of nylon and wool. In a similar manner, acid and vat dyes from among the anionic dyestuffs may be employed to best advantage on the polyacrylonitrile fibers, whereas the acrylonitrile-vinyl copolymers demonstrate some natural affinity towards the acid, metallized, vat and soluble vat dyestuffs, and developed, vat acid and soluble vat dyes may be employed to advantage on polyester fibers. On the other hand, the coloring assistants of the invention are functionally capable of promoting colorability of substrate materials with anionic dyestuffs which are normally totally non-affinitative towards the substrate, as, for example, in the case of fiberglass substrata towards direct dyes, or towards the cellulose fiber-reactive dyestuffs, and it is in connection with the vastly simplified coloring procedures which result from these phenomena that my invention should have its greatest effects on present industrial practices. In the same manner, some of the conventional as well as newer pigment colors which possess extreme lightfastness among other desirable properties, exhibit absolutely no affinity towards the synthetic hydrophobic fibers or fiberglass, but it becomes possible through use of the processing techniques of the invention to print and dye such substrata with these highly-desirable coloring agents by standard textile coloring techniques. Thus, deeper shades for some of the acrylics and polyester fibers can be obtained through use of improved vat pigments, for example, either by conventional printing or dyeing in conjunction with use of the aminoalkyl silicone coloring assistants, or, conceivably, through application of spin-dyeing procedures with single-bath aminoalkyl silicone-pigment dispersions. As applied to pigment colors, it is probably most accurate from the standpoint of conventional nomenclature, to refer to the aminoalkyl silicone coloring assistants as "pigment binders," but it should be understood that the former terminology is intended to embrace the latter, more restricted usage.

Among the numerous different coloring agents of the dyestuff type which I have utilized to good advantage in practicing the general processing techniques of the invention, the so-called cellulose fiber-reactive dyes are of particularly unique interest, in that these dyestuffs have been especially tailored for use in the dyeing and printing of cellulose substrate materials and have not, to my knowledge, been employed heretofore for any other type of coloring operation. In essence, the so-called cellulose fiber-reactive dyes constitute the prototype members of a potentially enormous class of dyestuffs which should revolutionize many sections of the coloring industry. In general, they are characterized by water-solubility in combination with good levelling and penetration properties, and yet, they are capable of producing dyeings or printings of extremely good wet fastness. In addition, they are completely adaptable to conventional coloring methods, and offer potential means for achieving low-temperature dyeings due to their rapid diffusibility into cellulose fibers, and their rapid rates of reaction. These dyes obtain their permanency on cellulosic fabrics through the formation of co-valent linkages with the cellulose molecules. Chemically, the so-called cellulose fiber-reactive dyes contain active halogen groups derived from cyanuric halides which have been reacted with the base color molecule. They may be represented by the structural formula:

$$S \cdot R \cdot X$$

wherein S represents the dye molecule grouping which produces water-solubility, R is the active coloring component of the molecule, and X is the reactive halogen which promotes combination with alkaline cellulose:

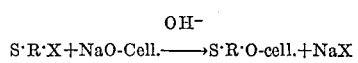

In the case of one class of said cellulose fiber-reactive dyes, for example, the active halogen group or groups in the dye molecule consist of chlorine atoms which are introduced by reaction of a base dyestuff with cyanuric chloride to yield the following dye-melamine structure:

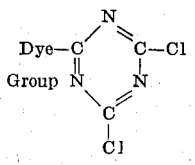

(See British Pat. No. 781,930 of Aug. 28, 1957; Journal of the Society of Dyers and Colourists, 73, 237–247—June 1957.)

By suitably controlling the reaction, it is possible to produce derivatives having one or two chlorine atoms for reaction with cellulose hydroxyl groups. Upon application of heat, and/or alkali, the dyes react with cellulose hydroxyl radicals to form cyanurate esters of the dyestuff molecule.

Members of this last-mentioned class of cellulose fiber-reactive dyes have been described as vinyl-sulfone reactive dyestuffs and have been discussed in an article entitled "Remazol Colors, A Chemically New System of Fiber-Reactive Dyestuffs," by Dr. E. P. Sommer, appearing in the American Dyestuff Reporter volume 47, No. 24, Dec. 15, 1958 on pages 895–899.

As might be expected, the so-called cellulose fiber-reactive dyes show absolutely no affinity towards any of the non-cellulosic, difficulty colorable substrate materials, such as glass fibers and the like. On the other hand, when these materials are treated with an aminoalkyl silicone coloring assistant in accordance with the general processing techniques of my invention, and whether heat-cured or simply air-dried, they demonstrate a remarkable affinity towards this class of dyestuffs, producing deeply and brilliantly colored materials. In fact, the reaction of the dyes with the aminoalkyl silicone-treated substrates is faster than that obtained with cellulose materials. My investigations with respect to the foregoing phenomenon demonsrate, a typical application of the processing techniques of the invention whereby a normally non-affinitative group of substrate materials can be rendered highly affinitative towards an extremely useful and efficient class of dyestuffs, through use of the unique aminoalkyl silicone coloring assistants.

It will be appreciated that much controversy has existed heretofore, and still continues, with respect to the precise mechanism of coloring, even as applied to the very oldest classes of dyestuffs and pigments, and proponents of the solid-solution theory, the mechanical theory, the chemical combination theory, and the theory of physical absorption, among others, have each adduced varying types of evidence in support of their theories. Admittedly, the exact mechanisms of the coloring phenomona realized in accordance with my invention have not been established by conclusive scientific evidence, and without intent to be bound or otherwise restricted beyond the actual beneficial end-results which can be obtained by the practice of the invention, it is believed that the following theories will aid others in pursuit of further improvements, and might well explain the coloring mechanisms which do occur upon use of at least some types of dyestuffs from among the general class described above.

With respect to several classes of cellulose fiber reactive dyes, it is believed that coloration may be produced by chemical reaction of amino groups from the coloring assistants with the chlorine group or groups in the cyanuric chloride residue of the dye molecule, according to the simple mechanism:

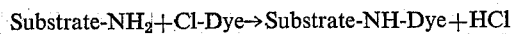

With the direct, acid, premetallized neutral, premetallized acid, and direct and developed dyes, each of which contains —$SO_3H$ and or —COOH groups, or alkali salts thereof, it is believed that the dye adsorption involves a simple salt formation or simple precipitation effect, as represented by the mechanism:

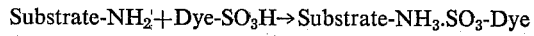

With both the indigoid and anthraquinone types of vat dyes, the mechanism is presumably more complicated, but it is believed that initial adsorption of the dye may involve an ionexchange effect with the leuco form of the dyestuff after it has been reduced with sodium hydrosulfite, as represented by the scheme:

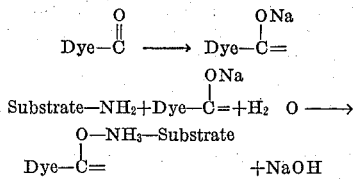

Here, the dye is adsorbed first in the leuco form and then it is oxidized, in situ, on the aminoalkyl silicon treated substrate and deposited as an insoluble pigment;

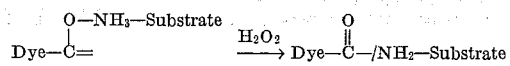

In the case of the soluble vat ester:

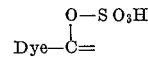

The initial adsorption is believed to be the same as with the direct, acid and other soluble dyes above, i.e., salt formation and then oxidation to the insoluable form on the substrate:

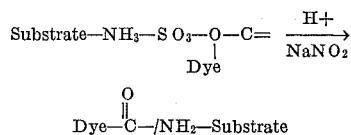

With respect to the sulfur dyes, I believe that the mechanism of coloring involves a combination of physical and chemical factors, but no definite theory has been established to the extent of warranting presentation in this disclosure.

As a result of a relatively extensive screening of the known aminoalkyl silicones, it has been demonstrated that virtually all stable members of this series can be employed as coloring assistants according to the processing techniques of my invention, although, unexplainably, certain of these compounds do exhibit somewhat superior color affinity for most coloring agents as compared with certain other compounds of the series. It is essential, only, that the coloring assistant contain at least one grouping of the formulation:

(I)         

wherein the divalent R-linkage between the silicon atom and amino nitrogen atom constitutes a hydrocarbon chain, preferably a linear or cyclic hydrocarbon chain of three (3) or more carbon atoms chain-length, on which the amino nitrogen is substituted no closer than the third carbon atom removed from silicon as, for example, a polymethylene chain of three or more carbon atoms, or a para-substituted c-pyridyl radical, and the like. The divalent R-linkage may be unsubstituted or carry additional hydrocarbon substituents along its length. The free valences of the amino nitrogen may both be substituted with hydrogen atoms in primary amine fashion, or as imine (secondary) or nitrile (tertiary) structures carrying organic radicals.

Typical of the organic radicals which may satisfy one or both of the free valences of the amino nitrogen atom are the alkyl radicals such as methyl, ethyl, propyl, cyclohexyl, octyl and the like or the substituted alkyl groups, particularly those which contain carbon, hydrogen and oxygen, as for example, hydroxyalkyl, alkoxyalkyl, polyalkoxyalkyl, hydroxypolyalkoxyalkyl, carboalkoxyalkyl, carboxyalkyl and the like, or those substituted alkyl groups which contain carbon, hydrogen and nitrogen, as for example, cyanoalkyl, polyaminoalkyl and the like, or those substituted alkyl groups which contain carbon, hydrogen, nitrogen and oxygen, as for example, N-hydroxy-alkyl-aminoalkyl and the like, as well as aryl radicals and/or substituted aryl radicals such as phenyl or pyrrolidyl and pyrrolyl radicals, or fused aromatic ring structures such as naphthalene, and the like. Alternatively, the nitrogen atom may be symmetrically substituted in bis-imine or tris-nitrile fashion by means of other polymethylene-silylidyne groupings [—$(CH_2)_aSi\equiv$]. The free valences on the one or more silicon atoms may be satisfied with mixed alkoxy and alkyl or aryl substituents where monomeric silanes are involved, or with Si—O linkages and alkyl and aryl radicals in the case of aminoalkylpolysiloxanes or copolymers of aminoalkylpolysiloxanes with other polysiloxanes. In essence, therefore, the functional grouping required in the coloring assitants of the invention may be represented in general by the following formula:

(II) 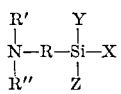

wherein R is a substituted or unsubstituted hydrocarbon group of at least 3 carbon atoms chain-length; R' and R" represent members selected from the group consisting of hydrogen and organic radicals, preferably, cyanoalkyl, hydroxyalkyl, carboalkoxyalkyl, carboxyalkyl, and aryl radicals, and the monovalent grouping:

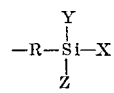

X is a member selected from the group consisting of alkoxy and siloxylidyne radicals [$\equiv$Si—O—]; and Y and Z are members selected from the group consisting of alkoxy, alkyl and aryl radicals.

As indicated above, the necessary functional aminoalkyl silicon grouping of the coloring assistants of my invention may be contained within a monomeric aminoalkylalkoxysilane, an aminoalkylpolysiloxane, or a copolymer or simple blend of an aminoalkylpolysiloxane with one or more other siloxanes. It is nit essential that these materials be employed in pure form but crude hydrolyzates or aqueous and aqueous-alcoholic solutions of the silicones can be employed directly to introduce the aminoalkyl silicon groups onto the substrate materials or into coloring baths to be used in coloring such substrata.

The aminoalkylalkoxysilanes which can be employed in practicing my invention may be represented in general by the following formula:

(III) 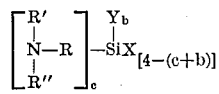

wherein R, R' and R" have the same meanings as previously assigned above; X is an alkoxy radical; Y is a member selected from the group consisting of alkyl and aryl radicals; $c$ is a whole number of from 1 to 2; $b$ is zero or a whole number of from 1 to 2; and the sum of $c+b$ is not greater than 3.

The following specific silanes are illustrative of some of the aminoalkylsilyl-functional derivatives included among the class of compounds defined within Formula III above:

beta-methyl-gamma-aminopropyltriethoxysilane
gamma-aminopropyltriethoxysilane
gamma-aminopropyltripropoxysilane
gamma-aminopropylmethyldiethoxysilane
gamma-aminopropylethyldiethoxysilane
gamma-aminopropylphenyldiethoxysilane
delta-aminobutyltriethoxysilane
delta-aminobutylmethyldiethoxysilane
delta-aminobutylphenyldiethoxysilane
gamma-aminobutyltriethoxysilane
gamma-aminoisobutylmethyldiethoxysilane
gamma-aminobutylmethyldiethoxysilane
N-beta-carbethoxyethyl-gamma-aminopropyltriethoxysilane
N-beta-cyanoethyl-delta-aminobutyltriethoxysilane
N-gamma-triethylsilylpropyl-pyrrolidine
N-gamma-triethoxysilylpropyl-2,5-dimethylpyrrolidine
N-phenyl-N-methyl-gamma-aminopropyltriethoxysilane
N-phenyl-N-methyl-delta-aminobutyltriethoxysilane
N-methyl-beta-methyl-gamma-aminopropyltriethoxysilane
N-beta-aminoethyl-gamma-aminopropyltrimethoxysilane
N-beta-aminoethyl-gamma-aminoisobutyldiethoxysilane
bis(gamma-triethoxysilylpropyl)imine
bis(beta-methyltriethoxysilylpropyl)imine
N,N-dimethyl-gamma-aminopropyltriethoxysilane
N-naphthyl-N-methyl-gamma-aminopropyltriethoxysilane
N-(furfuryl)-gamma-aminopropyltriethoxysilane, etc.

Aminoalkylalkoxysilanes of the foregoing type and methods for producing compounds of this structure, in general, are described and claimed in U.S. 2,832,754, issued Apr. 29, 1958; U.S. 3,044,982, issued July 17, 1962; and U.S. 3,045,036, issued July 17, 1962.

The alkoxysilylalkylamines, -imines, and -nitriles are generally characterized by their ability to form stable solutions with aqueous admixtures of organic compounds, which is a particularly desirable property from the standpoint of existing practices employed in the coloring industries. When placed in aqueous solution, the alkoxy groups hydrolyze at a slow rate such that the silane monomers are eventually converted to water-soluble aminoalkylpolysiloxanes. Aqueous admixtures of such polysiloxanes with water-soluble organic compounds conform to most requirements of stability encountered in the coloring industries.

The aminoalkylpolysiloxanes which can be employed to carry out the desired functional group represented by Formula I above for purposes of my invention, may be linear, cyclic or cross-linked in nature. The aminoalkylpolysiloxanes of the cross-linked variety are readily produced by the hydrolysis and condensation of the trialkoxy-substituted silylalkylamines, -imines or -nitriles, and can contain small amounts of silicon-bonded hydroxyl groups or silicon-bonded alkoxy groups depending on the conditions under which polymerization is conducted. For example, aminoalkylpolysiloxanes of this type which are essentially free of residual silicon-bonded alkoxy or hydroxyl groups can be produced by the complete hydrolysis and total condensation of an aminoalkyltrialkoxysilane, whereas polymers containing predominant proportions of residual alkoxy groups can be produced by the partial hydrolysis and total condensation of the same starting silane. In a similar manner, polymers containing predominant proportions of residual silicon-bonded hydroxyl groups can be produced by essentially complete hydrolysis and only partial condensation of the trifunctional silane starting materials. Polysiloxanes of the foregoing types may be represented in general by the following unit structural formula:

(IV) 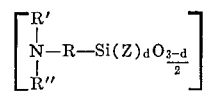

wherein R, R' and R" have the same meanings as previously assigned above, Z represents hydroxyl and alkoxy groups; and $d$ has an average value of from 0 to 2 and preferably from 0 to 1. Typical polymers from among the compounds of this class include gamma-aminopropylpolysiloxane, delta-aminobutylpolysiloxane, etc., and related hydroxy- and alkoxy-containing hydrolyzates and condensates of these polymers.

Aminoalkoxypolysiloxanes of the cyclic and linear varieties may be produced readily by the hydrolysis and condensation of dialkoxyalkyl- or dialkoxyarylsilylalkylamines, -imines, and nitriles. These polymers may be represented in general by the following structural formula:

(V) 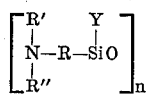

wherein R, R' and R" have the same meanings as previously assigned above; Y is an alkyl or aryl radical; and $n$ is an integer having a value of at least 3, with average values of from 3–7 for the cyclic polysiloxanes, and higher for the linear polysiloxanes. Typical cyclic polymers from among this class include the cyclic tetramers of gamma-aminopropylmethylpolysiloxane and delta-aminobutylmethylpolysiloxane, and the like. The linear polymers may be structures of the type of gamma-aminopropylmethylpolysiloxane, gamma-aminopropylethylpolysiloxane, deltaaminobutylmethylpolysiloxane, gamma-aminobutylmethylpolysiloxane, and the like. The linear aminoalkylpolysiloxanes further include alkyl, alkoxy and hydroxyl end-blocked materials which contain from 1 to 3 such groups bonded to the terminal silicon atoms of the molecules comprising the polymeric chains. For example, linear polymers such as monoethoxy end-blocked gamma-aminopropylethylpolysiloxane, methyldiethoxysilyl end-blocked delta - aminobutylmethylpolysiloxane, mono - ethoxydimethylsilyl end - blocked gamma - aminopropyl - phenylpolysiloxane, and the like, may be employed to impart the desired functional groups to a substrate or coloring bath. These end-blocked polymers may be readily produced by the equilibration of cyclic aminoalkylpolysiloxanes with silicon compounds containing predominant silicon-bonded alkoxy groups, or by the cohydrolysis and condensation of trialkylalkoxysilanes with aminoalkylalkyldiethoxysilanes or aminoalkylaryldiethoxysilanes. The hydroxy end-blocked polymers can be prepared, also, by heating linear or cyclic aminoalkylpolysiloxanes with water.

The copolymeric polysiloxanes which can be employed as coloring assistants in accordance with my invention may contain siloxane units consisting of any of the typical siloxyalkylamine, -imine or -nitrile groups depicted above, in combination with one or more other hydrocarbon-substituted siloxane units of any desired configuration, as represented in general by the formula:

(VI) 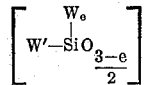

wherein W and W' are hydrocarbon radicals; and $e$ is an integer having a value of from 0 to 2. These copolymers may be produced by the cohydrolysis and condensation of typical aminoalkylsilanes with other hydrocarbon-substituted silanes, or by the direct equilibration of separate polymeric starting materials. The linear copolymers can also contain chain-terminating or end-blocking groups such as alkyl, hydroxyl and alkoxy radicals. The various polymeric and copolymeric materials of the types discussed hereinbefore, as well as processes for producing these materials, have also been described in substantial detail and claimed in the aforementioned copending applications.

The aminoalkyl silicone coloring assistants may also be employed in the form of their metal coordinated complexes with metallic components of the type of copper, chromium, cobalt, etc. Of particular interest in this connection are the copper complexes of the base resins and monomeric silanes, which may be readily prepared by aqueous reaction of the silicones with water-soluble copper derivatives such as cupric chloride, acetate or sulfate, or water-dispersible or insoluble copper derivatives such as the hydroxide, stearate and the like. The coloring assistants may be pre-complexed with the metal coordinates or reacted in situ to form the coordinated complexes.

While all of the aminoalkyl silicones seemingly are operative for purposes of inducing or improving the color-affinity of the various substrate materials described, I have found that certain compounds and compositions appear to approach a more universal color-acceptance status, while others produce somewhat less pronounced effects when viewed on a universal basis, but may prove to be extremely efficient when used in conjunction with a specific class of dyestuffs or pigments. Thus, one might assume that the degree of coloration is a function of the relative number of amino groups available within the coloring assistants, or that the primary-, secondary- or tertiary-substituted nature of the amino nitrogen atom might alter the color-affinity properties of the assistants, but my investigations have failed to establish these factors to be determinative, per se. For example, some of the silicones having the largest concentration of amino groups produce relatively inferior colorings, when compared with assistants of reduced amino concentration, under some conditions of operation. There is no scientific basis for rationalizing these effects at the present stage of my research, but it is believed that, as continuing research serves to elucidate the mechanism or mechanisms underlying the actual coloring phenomena, it will become possible to "tailor" the coloring assistants for specific coloring processes as well as for universal or general use.

In general, it would appear that for universal color-affinity, the most effective monomeric materials are the difunctional silanes, whereas the most effective polymeric or copolymeric materials are those which are completely condensed or substantially completely condensed from low molecular weight difunctional monomers. The specific compounds and compositions listed below have been found to be particularly efficient as dye assistants of the universal type:

(A) Homopolymer of delta-aminobutylmethylpolysiloxane;
(B) Copolymeric silcone comprised of 50% trimethylsiloxy end-blocked dimethylsiloxane and 50% delta-aminobutylmethylsiloxy groups.
(C) Copolymeric silicone comprised of gamma-aminopropyltriethoxysilane and amyltriethoxysilane (30% resin solids);
(D) Homopolymer from gamma-aminopropyltriethoxysilane; and
(E) Gamma-aminopropylmethyldiethoxysilane.

Still other compounds of unique performance characteristics have been identified within the experimental data reported hereinafter.

On the basis of prior experiences with the conventional forms of silicones such as dimethyl oils and the like, one might expect that use of the aminoalkyl silicones as coloring assistants on fibrous substrata such as textiles and leather goods, could promote certain beneficial ancillary properties including, by way of illustration, flame resistance, dimensional stabilization, water repellancy, or crease resistance. On the other hand, it was most unexpected to find that the principal ancillary property resulting from use of the aminoalkyl silicones is that of fixation or insolubilizing of all types of substantive dyestuffs. Thus, in my copending U.S. application Ser. No. 804,882, now abandoned, which was filed of even date with this application, I have described and claimed processes which are based on my discovery that the aminoalkyl silicones are excellent dye-fixatives, capable of improving the washfastness of all dyestuffs of the substantive type. Whereas the processes of my aforementioned copending application are directed specifically to the aftertreatment of substantively-dyed textiles of the type of cellulosic fabrics and the like, with aminoalkyl silicones to induce or promote fixation of their dye content, the processes of the present invention are intended to embrace similar fixative activities which may result as an incident to a promary coloring operation conducted with substantive dyestuffs through use of the aminoalkyl silicones in their principal capacity as coloring assistants. Of course, it should be apparent that one could effect a primary coloring operation with a substantive dyestuff according to the principles of my present invention, and thereafter promote enhanced fixation of the dyestuff to the substrate material by aftertreatment of the substrate with an aminoalkyl silicone in accordance with the processing techniques of my copending application.

The pre-treatment with and/or concurrent use within coloring media of an aminoalkyl silicone also results in the production of colored substrates having a unique affinity for those elastomeric polymers widely employed as pigment binders and/or textile finishes. Due to this affinity, such polymers are more effectively bonded to colored fibrous substrates produced in accordance with the present invention and hence better serve the original purposes for which they are widely employed. By way of illustration, cotton fabric treated with an aminoalkyl silicone when pigment-colored in a one-step operation employing an acrylic polymer (as a textile finish) in admixture with a coloring pigment possesses improved washfastness, crock resistance, and lightfastness properties as compared to cotton fabric which has been colored by the same procedure (wherein the acrylic polymer is both the pigment binder and textile finish) but which was not treated with an aminoalkyl silicone. In addition, glass fabric when pigment-colored by conventional means and treated with an acrylic polymer did not possess the excellent crock and crease resistance that characterized pigment-colored glass fabric prepared with the aid of an aminoalkyl silicone coloring assistant and treated with an acrylic polymer.

Elastomeric polymers which appear more effectively employed as finishes when applied to colored substrates prepared in accordance with this invention are, for the most part, polymers having a linear or two-dimensional structure that may contain pendant reactive groups such as carboxy, epoxy, methylolamide, vinylsilyl, and the like. When applied to fibrous substrates and cured, as for example by drying or heating and, with or without a catalyst, as the case may be, such polymers form elastomeric coatings thereon. In some instances such polymers can be blended or reacted with other polymers, as for example, urea-formaldehyde resins and the resultant product cured in the conventional manner. For the most part, such polymers are applied to substrates in the form of a latex and in many instances they are prepared by emulsion polymerization techniques. Typical of such polymers are: natural rubber, synthetic rubber, as for example, a butadiene-acrylonitrile copolymer latex, acrylate polymers, as for example, those prepared by the polymerization of one or more acrylic monomers such as methyl acrylate, ethyl acrylate, acrylic acid, acrylamide, acrylonitrile and the like, the internally plasticized vinyl acetate copolymers and the like polymers.

Without wishing to be bound by any particular theory, it is believed that elastomeric polymers of the above type are more effectively employed in combination with colored fibrous substrates that have been prepared with the aid of an aminoalkyl silicone for the reason that they contain groups that are reactive with those nitrogen-containing groups of the coloring assistant that have not been tied up in the coloring process. Hence, such elastomers become chemically bonded to the colored substrate rather than physically bonded thereto as the case would be when aminoalkyl silicones are not present.

As indicated above, elastomeric polymers can be applied to colored fibrous substrates that have been prepared with the aid of an aminoalkyl silicone after the coloring step is completed or, if desired, when pigments are employed they can be admixed with coloring pigments and the aminoalkyl silicone-treated fibrous substrate padded therewith. I have also found that when pigments are employed as the coloring agent, the pigment, polymer and aminoalkyl silicone coloring assistant can be admixed and the fibrous substrate padded therewith. While the unique affinity of colored substrates for those polymers commonly employed as pigment binders and textile finishes is most pronounced in the production of colored fibrous substrates, this same affinity exists in the treatment with such polymers of other colored substrates prepared by my invention.

In one embodiment of the present invention, the coloring process can be carried out with the aid of a silicone fluid. According to my findings, the use of a silicone fluid with an aminoalkyl silicone coloring assistant and coloring agent in the coloring process provides processing advantages, as for example, improvements in obtaining admixtures of the coloring assistant and coloring agent, better application of the coloring assistant to a substrate and the like. In addition, I have found that the use of a silicone fluid with a coloring assistant and coloring agent in accordance with my teachings provides colored fibrous and sheet substrates having a feel or hand which is similar in many respects to that of the substrates prior to coloring. Thus this embodiment of my invention provides a means to obtain a colored fibrous or sheet material having a relatively soft hand, should the particular application of the colored product require such.

Silicone fluids can be employed in the practice of the invention by a variety of methods. By way of illustration, they can be employed in admixture with the coloring assistant or in admixture with the coloring assistant and one or more additives such as water, solvent and acid, and the resulting mixture applied to a fibrous or sheet substrate prior to treatment with a coloring agent which, if desired, can also contain a silicone fluid in admixture therewith. In addition, the silicone fluid can be admixed with both the coloring assistant and coloring agent together with other additives, as may be desired, and the resulting mixture applied to a substrate. Moreover, the colored substrates produced by the invention, whether or not a silicone fluid was employed in their production, can be advantageously treated with a silicone fluid.

When silicone fluids are employed as an after-treatment for the colored substrates of this invention, they are preferably employed in combination with elastomeric polymer of the type described above as a pigment binder and/or textile finish. Thus, for example, a silicone fluid can be admixed with an acrylate polymer emulsion and the mixture applied to a colored fibrous substrate. If desired, the silicone fluid can be admixed with a coloring pigment and acrylate polymer emulsion and the mixture applied to an aminoalkyl silicone treated fibrous substrate.

The silicone fluids most useful in my coloring process are those polymeric materials known as polysiloxane oils, especially those oils which contain silicon-bonded hydrocarbon substituents or both silicon-bonded hydrocarbon and hydrogen substituents. Typical of such polysiloxane oils are dimethylpolysiloxane, beta-phenylethylpolysiloxane oil, diethylpolysiloxane oil and the like as well as those polysiloxane oils which contain dimethylsiloxane units, in addition to one or more siloxane units of the type which include methylethylsiloxane units, diethylsiloxane units, methylphenylsiloxane units, methylhydrogensiloxane units, beta-phenylethylmethylsiloxane units and the like. I can also employ as silicone fluids those copolymers of linear or branch chain polysiloxanes with polyoxyalkylene polymers.

The amount of silicone fluid that can be employed in the preparation of colored substrates is not narrowly critical and can vary over a wide range. In the preparation of colored fibrous substrates, as for example colored cloth having a relatively soft hand, I have found it convenient to employ a sufficient amount of the fluid in the processing steps as to provide a deposit of such fluid on the cloth of from about one-quarter to as much as four times the amount by weight of aminoalkyl silicone coloring assistant deposited on the cloth. Such can be accomplished by using baths containing an amount by weight of silicone fluid lying in the range of from about one-quarter to as much as four times the amount by weight of the coloring assistant. If the aminoalkyl coloring assistant and silicone fluid are applied in separate baths or if the silicone fluid is used in more than one bath, the total amount of silicone fluid employed in all of the treating baths should, for best results, lie in the same range with respect to the coloring assistant as set forth above for the instance where both are employed in a single admixture.

It is preferred that the silicone fluids useful as an aid in the preparation of colored substrates be employed in the form of an emulsion, as for example a water emulsion containing from about 10 to about 60 percent by weight of a polysiloxane oil. Thus, for example, when a silicone fluid is used in admixture with a coloring assistant, the bath is preferably prepared by forming a mixture containing the desired amount by weight of the coloring assistant one-quarter to four times the amount by weight of the coloring assistant of a silicone emulsion, a small amount of wetting agent with the remainder comprised of water and, if desired, a solubilizing acid.

While I have found it convenient to employ a silicone fluid in amounts of from about one-quarter to as much as four times the amount of coloring assistant, it should be pointed out that greater amounts of the silicone fluid can be employed with the result that greater amounts of the fluid will be deposited on the substrate; however, no advantage commensurate therewith is obtained.

In addition to silicone fluids, I can employ small amounts of known organic softeners for textiles such as emulsions of long-chain fatty acids, epoxidized soy-bean oil, long-chain quaternary amine compounds, as for example, octadecyltrimethylammonium chloride octadecyl-ethyleneimine and the like. However, such softeners when employed alone, although useful, do not have the over-all beneficial effects that are provided by silicone fluids.

Further improvements in the hand or feel of colored fibrous or sheet substrates, as for example, colored cloth or fabric, prepared with the aid of an aminoalkyl silicone coloring assistant and a pigment color can be obtained by subjecting such colored substrates to a washing procedure and/or to mechanical action, as for example, a pulling or stretching procedure.

The washing procedure can be carried out with water or with an admixture of water and a surface active agent such as soap or synthetic detergent. Accordingly, after a fabric has been subjected to the action of a coloring pigment in accordance with the present invention, the colored fabric is dried and washed. Washing can be accomplished by a variety of methods. By way of illustration, the dried colored fabric can be first rinsed with water, then subjected to the action of an admixture of water and soap and finally rinsed one or more times with water. In certain instances, rinsing with water will be sufficient and in other instances more thorough washing will be necessary.

The mechanical action to which pigmented fabrics can be subjected for the purpose of providing an improved hand can be best accomplished on mechanical apparatus which are capable of stretching or pulling fabric.

It is believed that my invention may be best understood by reference to the following specific examples which illustrate the foregoing principles and procedures as applied to the coloring of various types of substrate materials with different classes of coloring agents and a plurality of typical different aminoalkyl silicone coloring assistants. For the sake of convenience and brevity, the various aminoalkyl silicones which were employed within the experimental work reported in the examples, are consolidated in tabulated form in Table 1, and number-coded for ease of reference in the actual text of the examples.

TABLE I

| Coloring assistants numerical code designation | Compound or composition |
| --- | --- |
| 1 | gamma-Aminopropyltriethoxysilane. |
| 2 | delta-Aminobutyltriethoxysilane. |
| 3 | Copolymer of gamma-aminopropyltriethoxysilane and phenyltriethoxysilane (30% solids). |
| 4 | Thirty-percent (30%) ethanol solution of gamma-aminopropylpolysiloxane (homopolymer, 30% solids). |
| 5 | gamma-Aminopropylmethyldiethoxysilane. |
| 6 | Copolymer of gamma-aminopropyltriethoxysilane and phenyltriethoxysilane (30% ethanol solution). |
| 7 | N-phenyl-N-methyl-gamma-aminopropyltriethoxysilane. |
| 8 | Copolymeric silicone oil comprised of 95.2% trimethylsiloxy end-blocked dimethylsiloxane and 4.8% delta-aminobutylmethylsiloxy groups. |
| 9 | Homopolymer of delta-aminobutylmethylpolysiloxane. |
| 10 | Copolymeric silicone oil comprised of 75% trimethylsiloxy end-blocked dimethylsiloxane and 25% of delta-aminobutylmethylsiloxy groups. |
| 11 | Copolymeric silicone oil comprised of gamma-aminopropyltriethoxysilane and vinyl-triethoxysilane (25% resin solids). |
| 12 | Copolymeric silicone oil comprised of gamma-aminopropyltriethoxysilane and amyltriethoxysilane (30% resin solids). |
| 13 | Cobalt chelate of gamma-aminopropyltriethoxysilane (17% in $H_2O$). |
| 14 | Copolymeric silicone oil comprised of 83.3% trimethylsiloxy end-blocked dimethylsiloxane and 16.7% gamma-aminopropylsiloxy groups. |
| 15 | gamma-Aminopropylpolysiloxane; the homopolymer from gamma-aminopropyltriethoxysilane (50% solids in ethanol). |
| 16 | N-naphthyl-gamma-aminopropyltriethoxysilane. |
| 17 | Copolymer comprised of 50% trimethylsiloxy end blocked dimethylsiloxane and 50% delta-aminobutylmethylsiloxy groups. |
| 18 | Copolymer comprised of 70% trimethylsiloxy end-blocked dimethylsiloxane and 30% N,N-bis(beta-hydroxyethyl)-delta-aminobutylmethylsiloxy groups. |
| 19 | Copolymer comprised of 27% trimethylsiloxy end-blocked dimethylsiloxane, 40% diphenylsiloxy groups, and 33% delta-aminobutylmethylsiloxy groups. |
| 20 | Copolymer comprised of 68.5% trimethylsiloxy end-blocked dimethyl siloxane, 25% diphenylsiloxy groups, and 6.5% delta-aminobutylmethylsiloxy groups. |
| 21 | N-gamma-Triethoxysilylpropylpyrrolidene hydrochloride. |
| 22 | N-beta-Cyanoethyl-delta-aminobutyltriethoxysilane. |
| 23 | N,N-dimethyl-gamma-aminopropyltriethoxysilane hydroiodide. |
| 24 | beta-Methyl-gamma-aminopropyltriethoxysilane. |
| 25 | bis-(beta-Methyltriethoxysilylpropyl)imine. |
| 26 | N-methyl-beta-methyl-gamma-aminopropyltriethoxysilane. |
| 27 | N-beta-Carbethoxyethyl-gamma-aminopropyltriethoxysilane. |
| 28 | N-beta-Cyanoethyl-delta-aminobutylmethylpolysiloxane; (Mainly cyclics). |
| 29 | N-(beta-furfuryl)-gamma-aminopropyltriethoxysilane. |
| 30 | delta-Aminobutylmethyldiethoxysilane. |
| 31 | delta-Aminobutylmethylpolysiloxane (crude product otherwise comparable to 9 above; made by non-solvent hydrolysis of 30). |
| 32 | Same as 31 except made by solvent hydrolysis. |
| 33 | delta-Aminobutylmethylpolysiloxane incompletely condensed and thus probably containing silicon-bonded ethoxy or hydroxyl groups (60% solids in ethanol). |
| 34 | Aminomethyltriethoxysilane. |
| 35 | N,N-bis(beta-hydroxypropyl)-gamma-aminopropylpolysiloxane. |

TABLE I.—Continued

| Coloring assistants numerical code designation | Compound or composition |
|---|---|
| 36 | Copolymeric silicone comprised of 60% trimethylsiloxy end-blocked dimethylsiloxane and 40% N-beta-hydroxystearyl-gamma-aminoisobutylmethylsiloxane units. |
| 37 | N-octyl-gamma-aminoisobutylmethyldiethoxysilane. |

NOTE.—Copolymeric coloring assistants described as copolymeric silicones comprised of trimethylsiloxy end-blocked dimethylsiloxane and one or more specific siloxane units of another type are copolymers usually prepared by the coequilibration of a trimethylsiloxy end-blocked dimethylpolysiloxane with a cyclic or linear silicone composed of the specific siloxane units referred to. Thus such materials are trimethylsiloxy end-blocked polymers containing dimethylsiloxane units as well as the unit or units specified.

EXAMPLE I

Fiber glass cloth: Direct cellulose substantive dyes

Glass fabric substrata were treated with 5% solutions (1.65% deposits) of various coloring assistants from Table I by padding samples of heat-cleaned glass fabric through solutions of the following composition:

|  | Percent |
|---|---|
| Coloring assistant | 5 |
| Acetic acid | 5 |
| Isopropanol | 40 |
| Water | 40 |

After drying and curing at 300° F. for ten minutes, the samples were dyed with a solution consisting of:

a dye having a color index number of 24410 (on cloth weight)
1.5% Glauber's salt
40:1 bath:fabric ratio
30 minutes at 180° F.

Cold water rinse

The glass cloth samples were placed in the dye solution at 180° F. and stirred for 20 minutes. The Glauber's salt was then added and dyeing was continued for another 10 minutes. The samples were removed from the dye bath, given a cold water rinse and air-dried. The relative colorations produced by the various coloring assistants towards this otherwise totally non-affinitative substrate material are presented in tabulated form in Table II. The samples were rated in accordance with the following depth of color scale which is based on a qualitative ranking with ratings of from 3 to 5 being considered to be good dyeing:

5 = very deep shade
4 = deep shade
3 = medium shade
2 = light shade
1 = tinting only
0 = no coloration—sample remains white.

By reference to these data, it will be seen that by far the deepest color was produced by coloring assistant No. 9. It should be mentioned that the relative ratings of the coloring assistants as given in the following table follows very closely the ratings obtained with the same aminoalkyl silicones in the fixing of substantive dyestuffs on cotton and rayon fabrics according to the process of my aforementioned copending application.

TABLE II

Jig dyeing of aminoalkyl silicone-treated glass textiles with cellulose substantive dyestuff
(DYE HAVING A COLOR INDEX NUMBER OF 24410)

| Aminoalkyl silicone coloring assistant (Table I): | Depth of shade scale |
|---|---|
| 9 | 5 |
| 10 | 4 |
| 12 | 4 |
| 15 | 3 |
| 6 | 3 |
| 5 | 2 |
| 11 | 2 |
| 14 | 2 |
| 4 | 1 |
| 1 | 1 |
| Control (untreated) | 0 |

EXAMPLE II

Fiber glass cloth: Direct dyes

Samples of three different aminoalkyl silicone-treated glass fabric substrata were dyed in a pad dyeing operation employing a dye having a color index number of 29225.

The dye baths contained two percent dyestuff and 0.5% of a wetting agent, and the dyeings were conducted at a bath temperature of 160° F. The samples of cloth were padded with the dye solution at 33.3% wet pick-up and dried for five minutes at 300° F., followed by a cold water rinse. The results of these dyeings are tabulated in Table III below on the basis of the color scale of Example I.

TABLE III.—PAD DYING OF AMINOALKYL SILICONE-TREATED GLASS TEXTILES WITH DIRECT DYESTUFFS

| Dyestuff | Depth of color ratings | | |
|---|---|---|---|
| | Aminoalkyl silicone coloring assistant No. 9 | Aminoalkyl silicone coloring assistant No. 10 | Aminoalkyl silicone coloring assistant No. 12 |
| C.I. 29225 | 3 | 3 | 2 |
| | (Control-uncolored) | | |

EXAMPLE III

Fiber glass cloth: Acid wool dyestuffs

Glass fabric swatches treated with various different aminoalkyl silicone coloring assistants to deposit 1.65% solids as described in the preceding examples, were dyed with the following acid wool dye bath:

2% of a dye having a color index number of 63010 (on cloth weight)
10% Glauber's salt
1% acetic acid
30:1 Bath:cloth ratio In these tests, the fabric samples were placed in the dye bath at 120° F. containing one-half of the acetic acid. The solution was heated to boiling temperature in 15–20 minutes. The remaining acetic acid was then added and boiling was continued for 30 minutes. The samples were then removed from the dye bath and rinsed.

The results of these dyeings are rated in tabulated form in Table IV below based on the rating scale of Example I. It will be noted that the relative efficiency rating of the coloring assistants is different than that obtained with the same silicones on direct dyeing, although certain of the assistants were effective for both classes of dyestuffs.

TABLE IV

Jig dyeing of aminoalkyl silicon-treated fiber glass textiles with acid wool dyestuff

DYE HAVING A COLOR INDEX NUMBER OF 63010

| Aminoalkyl silicone coloring assistant (Table I): | Depth of shade ratings |
|---|---|
| 12 | 4 |
| 6 | 4 |
| 15 | 4 |
| 10 | 3 |
| 9 | 3 |
| 5 | 3 |
| 14 | 2 |
| 11 | 2 |
| 1 | 2 |
| 4 | 2 |
| Control (untreated) | 1 |

EXAMPLE IV

Fiber glass cloth: Acid wool dyestuffs

An acid dye having a color index number of 18050 was tested with glass cloth substrata by the exact same technique described in Example III. The results of these dyeings are rated in tabulated form in Table V below on the rating scale of Example I. It will be noted that coloring assistant No. 17 was superior to the other aminoalkyl silicones tested, whereas No. 9, which produced superior results with the cellulose fiber reactive dyes, was relatively less effective with these dyestuffs.

TABLE V

Jig dyeing of aminoalkyl silicone-treated fiber glass textiles with acid dyestuffs

| Aminoalkyl silicone coloring assistant (Table I): | Depth of color ratings—Dye having a color index number of 18050 |
|---|---|
| 17 | 5 |
| 10 | 4 |
| 12 | 4 |
| 9 | 2 |
| 15 | 1 |
| Control (untreated) | 1 |

EXAMPLE V

Fiber glass cloth: Vat dyestuffs

Aminoalkyl silicone-treated fiber glass textiles prepared in accordance with the procedure of Example I were subjected to dyeings with the vat dyestuff having a color index number of 59825/6 using the following dye bath and dyeing cycle:

2% vat dye on fabric weight
1% NaOH
1.5% sodium hydrosulfite
40:1 bath:cloth ratio
25 minutes at 120° F.

The dye bath was kept at 120° F., the samples were added and agitated for 10 minutes. NaCl as a 10% solution was added to promote exhaustion. After 5 minutes, more NaCl was added. The total dyeing time was 25 minutes. The samples were then removed from the dye bath and rinsed in cold water. They were then immersed in an oxidizing solution containing 0.5% of 30% hydrogen peroxide, soaped and air dried. The results of these dyeings are shown in tabulated form in Table VI below on the basis of the rating scale of Example I. It will be seen that all of the coloring assistants tested were effective in promoting coloration of the fiber glass substrata, whereas at least half of them produced medium to very deep coloration of the fiber glass.

TABLE VI

Jig dyeing of aminoalkyl silicone-treated fiber glass textiles with vat dye

A VAT DYE HAVING A COLOR INDEX NUMBER 59825/6

| Aminoalkyl coloring assistant (Table I): | Depth of color ratings |
|---|---|
| 10 | 5 |
| 9 | 4 |
| 15 | 4 |
| 6 | 4 |
| 12 | 4 |
| 5 | 3 |
| 14 | 3 |
| 11 | 2 |
| 1 | 2 |
| 4 | 2 |
| Control (untreated) | 1 |

EXAMPLE VI

Fiber glass cloth: Vat dyestuffs

Additional vat dyeing of aminoalkyl silicone-treated glass cloth substrata were conducted with the following dyestuffs:

Vat dye having a color index number of 59825/6.
Vat dye having a color index number of 70800.

The dye baths and dyeing technique were as follows:

2% vat dye on cloth weight
1% NaOH
1.5% sodium hydrosulfite
30:1 bath:cloth ratio
25 minutes at prescribed temperature The dyes were initially pasted with one to two drops of sodium alkyl sulfate wetting agent and a small amount of water. The predissolved NaOH was added and then the remainder of the water. After raising the bath temperature, the hydro was added with stirring and allowed to stand for 15 minutes. The pieces of glass cloth were wet-out at the desired temperature with a solution of the wetting agent and placed in the dye baths. After 15 minutes, 10 grams of 10% NaCl for each 10 grams of cloth were added to the baths. After 5 minutes an equivalent amount of salt was again added and dyeing continued. The swatches were removed from the dye baths, rinsed in cold water and oxidized in 0.5% of 30% hydrogen peroxide solution. They were then soaped in a 1% soap solution at 50–60° C. and rinsed.

The results of these dyeings are presented in tabulated form in Table VII below on the basis of the color scale of Example I. With reference to these ratings, it will be seen that coloring assistants Nos. 9, 17 and 12 produced the best colorations.

TABLE VII.—JIG DYEING OF AMINOALKYL SILICONE-TREATED FIBER-GLASS TEXTILES WITH VAT DYE-STUFFS

| Aminoalkyl silicone coloring assistant (Table I) | Dye having color index Number 59825/6 | Dye having color index Number 70800 |
|---|---|---|
| 9 | 5 | 4 |
| 17 | 4 | 4 |
| 12 | 4 | 4 |
| 15 | 3 | 3 |
| 10 | 2 | 3 |
| Control (untreated) | 0 | 1 |

EXAMPLE VII

Fiber glass cloth: Vat dyestuffs

Two additional vat dyestuffs were employed in pad dyeing of aminoalkyl silicone-treated glass cloth substrata, namely, vat dyes having color index numbers of 70320 and 71050, respectively. The dye baths for these colorings were formulated as follows:

| | Grams |
|---|---|
| Vat dye | 2.5 |
| NaOH | 4.0 |
| Hydro | 6.0 |
| Water | 402.5 |

The dye baths were prepared as described in Example VI. The samples of fiber glass cloth were wet-out with a solution of a sodium alkyl sulfate wetting agent and padded at 33.3% wet pick-up through the dye solution. They were rinsed in cold water, oxidized in 0.5% of 30% hydrogen peroxide, rinsed and air dried.

The results of these dyeings are presented in tabulated form in Table VIII below on the basis of the color scale of Example I. By reference to these results it will be seen that only light shades were obtained with all of the coloring assistants, and it is believed that a higher dye concentration would result in improved colorations.

TABLE VIII.—PAD DYEING OF AMINOALKYL SILICONE-TREATED FIBERGLASS CLOTH WITH VAT DYESTUFFS

| | Depth of color ratings | |
|---|---|---|
| Aminoalkyl silicone corloring assistant (Table I) | Dye having a color index number of 70320 | Dye having a color index number of 71050 |
| 9 | 3 | 2 |
| 15 | 2 | 2 |
| 10 | 2 | 2 |
| Control (untreated) | 2 | 2 |

EXAMPLE VIII

Fiber glass cloth: Concentration studies of coloring assistants with miscellaneous dyestuffs

*General.*—A group of seven different coloring assistants were tested in a series of concentration studies conducted on fiber glass cloth substrata in conjunction with various types of anionic dyestuffs. In this study, the aminoalkyl silicone coloring assistants were applied to fiber glass cloth samples from three different pad-bath concentrations, namely, 3%, 6% and 9% solids. On padding, the wet pick-up was 25% such that the respective concentrations actually deposited 0.75%, 1.50% and 2.25% aminoalkyl silicone solids on the glass cloth substrata. These dyeings were conducted with the following specific coloring assistants from among those listed in Table 1: Nos. 1, 4, 5, 9, 12, 15 and 17.

All of the coloring assistants were applied from aqueous solutions containing 0.1% of a sodium alkyl sulfate wetting agent. Coloring assistants Nos. 9, 12 and 17 were used with 5% acetic acid in the dye baths, since these silicones do not exhibit sufficient solubility in water alone. After padding, all of the treated samples were dried for 10 minutes at a temperature of 300° F. Coloring assistant No. 15 was restricted in its use to the 3% concentration owing to an insufficient supply of this silicone. Upon treating, the substrate samples had varying degrees of fullness.

Dyeing of the aminoalkyl silicone-treated substrata was effected with ten different dyestuffs of various classes. These dyeings are detailed within the following subsections:

(A) Direct and developed dyestuff

Dyestuff: A dye having a color index number 22.590
Dye Bath:
  5% dye on cloth weight
  0.5% dioctyl sodium sulfosuccinate—75%
Bath ratio: 30:1

The dyestuff was pasted with small amounts of hot water and the sulfosuccinate wetting agent was added to the dye bath at a temperature of 122° F. The samples of glass cloth, pre-wetted with water, were then added to the dye bath. The temperature of the dye bath was raised in 15 minutes to 180° F., then 1.5 milliliters of 10% sodium chloride solution was added per each gram of fabric in the bath. Dyeing was continued for 15 minutes at 180° F., then the same amount of sodium chloride was added to the bath. Dyeing was continued for an additional 15 minutes. The cloth samples were removed from the dye bath and rinsed in cold water before diazotizing. The following diazotizing bath was employed:

3% sodium nitrite
6% HCl (37%) (all on weight of cloth)
Bath ratio of 30:1

The rinsed glass cloth samples were placed in the diazotizing bath and kept at 10–15° C. for 10 minutes. The samples were then removed and developed in a solution consisting of 1.0% beta naphthol and 0.5% sodium hydroxide, at 122° F. for 10 minutes. They were thereafter rinsed in cold water followed by scouring with 0.5% of an anionic surfactant (fatty methyl tauride) at 160° F., and finally cold water-rinsed and dried at room temperature.

The results of this dyeing operation as well as the remaining dyes given in subsections B–J below, have been tabulated for convenient reference within Table IX presented hereinafter.

(B) Vat dyestuff

Dyestuff: A dye having a color index number of 59825/6
Dye bath:
  3% dye on cloth weight
  1.5% sodium hydrosulfite on cloth weight
  1.0% sodium hydroxide on cloth weight
  0.5% dioctyl sodium sulfosuccinate—75%
Bath ratio: 30:1

The dyestuff was pasted with the wetting agent and a small amount of warm water, and then added to the rest of the water. Thereafter, the sodium hydroxide was added to the dye bath, and the bath temperature raised to 120° F. The sodium hydrosulfite was slowly added with stirring and the resultant bath was permitted to stand for 15 minutes at 120° F. The samples of glass cloth were wetted with the 0.1% of a sodium alkyl sulfate solution and added to the dye bath. After 15 minutes, 1 milliliter per gram of fabric of 10% sodium chloride solution was added to aid exhaustion. After 5 minutes, the same amount of sodium chloride was added and dyeing continued for 5 more minutes. The samples of glass cloth were removed from the dye bath, rinsed in cold water, and oxidized in 0.5% hydrogen peroxide solution. They were then soaped at 160° F. in 0.5% of an anionic surfactant solution, rinsed and dried.

(C) Vat ester dyestuff

Dyestuff: A dye having a color index number of 59825/6
Dye bath:
  3% dye on cloth weight
  0.5% dioctyl sodium sulfosuccinate—75% on cloth weight
  1.0% Glauber's salt
  0.5% sulfuric acid
  2.0% NaNO$_2$ on cloth weight
Bath ratio: 30:1

The dye was pasted with wetting agent and warm water and then diluted with cold water. The glass cloth samples were wet out with 0.1% solution of a sodium alkyl sulfate wetting agent and placed in the dye bath. The temperature was raised to 140° F. After 10 minutes, one half of the Glauber's salt was added and dyeing was continued for 10 minutes. Then the remaining Glauber's salt and sodium nitrite, predissolved, were added. The bath was stirred for 10 minutes and then cooled to 100° F. At this point, the sulfuric acid, premixed with 4 parts of water, was added. The color was allowed to developed for 10 minutes, the dyed glass cloths were removed from the bath, rinsed in water, and then soaped in a 0.5% solution of a fatty methyl tauride surfactant at 160° F. After a cold water rinse, they were air-dried.

(D) Direct dyestuff—1

Dyestuff: A dye having a color index number of 24410
Dye Bath:
   3.0% dye on cloth weight
   0.5% dioctyl sodium sulfosuccinate—75%
Bath ratio: 30:1

In this dyeing operation, the glass fabrics were wet out with a 0.1% solution of a sodium alkyl sulfate wetting agent, and immersed in the dyebath at 160° F. The temperature was raised to 180° F. in 15–20 minutes, and 1 milliliter per gram of fabric of a 10% sodium chloride solution was added to promote exhaustion. After 15 minutes, the same amount of salt was added. After 10 more minutes, the same amount of salt was again added. Dyeing was continued for 10 minutes longer, then the samples were removed, rinsed in a 10% sodium chloride solution at 95° F., soaped in a 0.5% solution of a fatty methyl tauride surfactant, and then given two cold water rinses and air-dried.

(E) Naphthol dyestuff

Dyestuff: A base having a color index number of 37505
Dye bath:
   3.0 grams Naphthol AS per 5 grams of cloth
   10.0 cubic centimeters of methoxyethanol per 5 grams of cloth
   3.0 cubic centimeters 62° Twaddle NaOH The dyestuff was pasted and added to 250 cubic centimeters (per each 5 grams of cloth) of water, to which were added 4 cubic centimeters of 62° Twaddle NaOH. The cloth samples were wet out with a 0.1% solution of a sodium alkyl sulfate wetting agent, and added to the base solution. After 10 minutes at room temperature, there was added 10% sodium chloride, based on the weight of the cloth samples in the bath. After 10 minutes, the samples were removed and the excess liquor was extracted by padding. The samples were then dried for 5 minutes at 250° F.

*Color salt.*—The above samples were padded through a 5% aqueous solution of the color salt and held for 30 seconds in air to develop the color before rinsing in cold water. They were re-rinsed in warm water, followed by soaping in a 2% soap flake solution and 1% $Na_2CO_3$, and final water rinsing and drying.

The results of the foregoing series of dyeings are tabulated in Table IX below on the basis of the color scale of Example I. By reference to the table, it will be seen that coloring assistant No. 1 and its polymer No. 4, produced generally inferior colorations in all of the 5 dyeings. Coloring assistants Nos. 5 and 15 yielded medium depth of color with some of the dye classes, but inferior coloring with others. Very little improvement could be detected upon increasing the bath conventration from 3% to 9% for these four coloring assistants.

The two most efficient coloring assistants at all concentrations were Nos. 17 and 9. These seemed to approach the most universal status for all dye classes, with No. 9 possibly exhibiting the better action of the two, although it was poorest for the naphthol finishing.

Coloring assistant No. 12, which is a copolymer of No. 1, gave the third best performance on a universal basis, i.e., general dyeing. While it was poorer than Nos. 9 and 17 in some classes, it yielded bettter dyeing with the naphthol dye.

It was concluded on the basis of these tests as well as those reported in Example I–VII, that coloring assistants Nos. 1, 4, 5 and 15, whether applied from acid or alkaline systems to these most difficulty colorable substrata, are generally inferior to assistants Nos. 9, 12 and 17. On the other hand, the application of the former four coloring assistants to heat clean glass cloth, under the alkaline conditions employed in these tests, seemed to yield poorer colorations than those previously obtained in the acid cycle.

TABLE IX.—CONCENTRATION STUDIES OF COLORING ASSISTANTS WITH VARIOUS DYESTUFFS

| Aminoalkyl silicone coloring assistant (Table I) | Depth of color ratings | | | | |
|---|---|---|---|---|---|
| | D & D | Vat | Van Ester | Direct-1 | Naphthol$_1$ |
| Control-None | 1 | 1 | 2 | 1 | 3 |
| No. 12(3%) | 2 | 4 | 4 | 1 | 2 |
| No. 12(6%) | 3 | 4 | 5 | 1 | 2 |
| No. 12(9%) | 3 | 4 | 5 | 1 | 1 |
| No. 17(3%) | 4 | 5 | 3 | 1 | 1 |
| No. 17(6%) | 4 | 5 | 3 | 2 | 3 |
| No. 17(9%) | 5 | 5 | 3 | 2 | 4 |
| No. 9(3%) | 4 | 4 | 4 | 3 | 1 |
| No. 9(6%) | 4 | 4 | 5 | 4 | 3 |
| No. 9(9%) | 5 | 4 | 5 | 5 | 3 |
| No. 15(3%) | 2 | 3 | 3 | 1 | 2 |
| Control-None | 1 | 1 | 2 | 1 | 1 |
| No. 1(3%) | 1 | 2 | 2 | 1 | 4 |
| No. 1(6%) | 1 | 0 | 1 | 1 | 1 |
| No. 1(9%) | 1 | 0 | 2 | 1 | 1 |
| No. 4(3%) | 2 | 2 | 2 | 1 | 1 |
| No. 4(6%) | 1 | 1 | 1 | 1 | 1 |
| No. 4(9%) | 1 | 0 | 2 | 1 | 1 |
| No. 5(3%) | 2 | 3 | 3 | 1 | 1 |
| No. 5(6%) | 2 | 2 | 3 | 1 | 1 |
| No. 5(9%) | 2 | 2 | 3 | 1 | 1 |

EXAMPLE IX

Fiberglass cloth: Delta-aminobutyl-substituted coloring assistants with various dyestuffs In view of the relatively unique activity of coloring assistant No. 9 in previous dyeings, studies were made with a group of crude products containing the same functional group to determine the effects of purity on the overall color affinity activity of the aminoalkyl silicones. In these investigations, the relatively crude silicone coloring assistants Nos. 31, 32 and 33 were compared with coloring assistant No. 9, their monomeric parent No. 30, and No. 2, a trifunctional material containing the same aminoalkyl substituent.

The coloring assistants were all applied to glass cloth substrata from padding baths containing 5% aminoalkyl silicone solids, 5% glacial acetic acid, 0.1% of a sodium alkyl sulfate wetting agent, and 89.9% water. The wet pick-up on padding was 30%, so that 1.5% silicone was present on the glass cloth prior to curing at 300° F. for 10 minutes.

The six differently treated fabrics were each dyed with five different dyestuffs of the following formulations:

This dyeing was also effected in accordance with the same technique as described in Example XIV, Section (G) above.

(A)          Acid dyestuff-neutral dyeing

Dyestuff: A dye having a color index number of 22245
Dye bath:
   3.0% dye on cloth weight
   20.0% Glauber's salt on cloth weight
Bath Ratio: 30:1

In this dyeing, the glass fabrics were wet in a 0.1% solution of a sodium alkyl sulfate wetting agent and then placed in the dye bath at 120° F. The bath temperature was raised to 160° F. in 30 minutes and the samples were dyed for another 30 minutes without further heating of the dyebath. They were then removed, soaped in a 0.5% soap flake solution at 160° F., rinsed twice with cold water and air-dried.

(B)          Vat ester dyestuff—1

Dyestuff: A dye having a color index number of 59825/6
Dye batth: Same as in Example VIII, subsection (C)

This dyeing was effected in accordance with procedure described in ExampleVIII, subsection (C) above.

(C)          Vat ester dyestuff—2

Dyestuff: A dye having a color index number of 73395/6
Dye bath: Same as in Example VIII, subsection (C)

This dyeing was also effected in accordance with the procedure described in Example VIII, subsection (C) above.

(D) Direct and developed dyestuff

Dyestuff: A dye having a color index number of 22590
Dye bath: Same as in Example VIII, subsection (A)

This dyeing was effected by the procedure described in Example VIII, subsection (A).

(E) Sulfur dyestuff

Dyestuff: A dye having a color index of 53720/1
Dye bath:
 3.0% dye on cloth weight
 3.0 sodium sulfide on cloth weight
 10.0% $Na_2CO_3$ on cloth weight
Bath ratio: 50:1

In this series of dyeings, the dyestuff, sodium sulfide and 10 parts of the total water (boiling) are mixed together and then diluted to full volume with cold water. The $Na_2CO_3$ was added and stirred. Thereafter, the treated glass cloth samples were immersed in the dye solution and heated to 195–200° F. and maintained at this temperature for 15 minutes. Twenty percent sodium chloride based on cloth weight was then added and dyeing was continued at 195–200° F. for 45 minutes. The samples were removed from the dye bath, rinsed in warm water, soaped in a 0.1% solution of a sodium alkyl sulfate at 160° F., rinsed in cold water, and finally air-dried.

The results of the foregoing dyeings have been presented in tabulated form in Table X below based on the color scale of Example I. By reference to these data, it will be seen that the crude hydrolyzate coloring assistants Nos. 31, 32 and 33 of the monomeric coloring assistant No. 30 gave depth of color ratings similar to the pure coloring assistant No. 9 of related structure. Of the first three coloring assistants, Nos. 31 and 32 were virtually identical in performance to the pure coloring assistant No. 9. No. 33 produced slightly less depth of color with a few of the dyes. These tests clearly demonstrate that the less expensive crude compositions can be employed in lieu of the pure aminoalkyl silicone coloring assistants.

In examining the samples treated with the monomeric coloring assistant No. 30, it was found that these generally had less color than those treated with the polymers, although in a few cases they were equal or substantially equal in performance. The trifunctional silanic coloring assistant No. 2, in turn, produced less general coloration than the difunctional silanic coloring assistant No. 30.

Although the two monomeric coloring assistants (2 and 30) presumably deposited less total solids after curing (due to loss of $C_2H_5OH$), the differences in depth of dyeing produced between these and the polymeric coloring assistants (31, 32 and 33) may not be simply a function of the weight of silicone on the substrate. That is to say, the concentration studies reported in Example VIII for other monomers, do not show improvements in dyeing reflecting a threefold increase in the concentration of applied solids.

TABLE X.—DELTA-AMINOBUTYL-SUBSTITUTED MONOMERS AND POLYMERS APPLIED TO FIBERGLASS CLOTH AND DYED WITH VARIOUS DYESTUFFS

| Aminoalkyl silicone coloring assistant (Table I) | Depth of color ratings | | | | |
|---|---|---|---|---|---|
| | Neutral | Vat Ester 1 | 2 | D & D | Sulfur |
| No. 9 | 5 | 5 | 2 | 5 | 5 |
| No. 31 | 4 | ----- | 2 | 5 | 4+ |
| No. 32 | 4 | 4 | 2 | 5– | 4+ |
| No. 33 | 5+ | 3– | 2 | 4 | 4+ |
| No. 30 | 3 | 4– | 2 | 4– | 4+ |
| No. 2 | 3– | 3 | 3 | 2 | 2 |

EXAMPLE X

Fiberglass textiles: Sulfur, vat and soluble vat ester dyeings of delta-aminobutylmethylpolysiloxane-treated substrata In view of the previous performance of coloring assistant No. 9, a series of glass textile substrata treated with this silicone were subjected to dyeings with various dyestuffs from the classes of vats, soluble vat esters and sulfur colors to obtain additional data on range of shades, etc. In these dyeings, the various dyestuffs were used in glass cloth which had been pretreated with a 5% acetic acid solution of coloring assistant No. 9. The sulfur colors and regular vat dyes were employed at 3% concentration based on weight of cloth, whereas the soluble vat esters were employed at 3% and, in some cases, at 5% concentration. The dyeings for each class of dyestuff was effected by the same procedures described hereinbefore for these respective classes. In the case of the vat dyes, the dyeing temperature recommended by the manufacturer for each dye was used. The dyestuffs selected for testing included many which have lightfastness ratings of from 80–160 Fadeometer hours. The dyes are listed below by Color Index Number:

(A) Sulfur dyestuffs (1) C.I. 53055
(2) C.I. 5440
(3) C.I. 53720/1

(B) Soluble vat ester dyestuffs (5) C.I. 59100/1
(6) C.I. 59825/6
(7) C.I. 73395/6
(8) C.I. 73360/1
(9) C.I. 69500/1
(10) C.I. 73065/6

(C) Regular vat dyestuffs

(11) C.I. 59825/6
(12) C.I. 70800
(13) C.I. 71050
(14) C.I. 59100
(15) C.I. 59850
(16) C.I. 73360/1
(17) C.I. 69825
(18) C.I. 73065/6
(19) C.I. 70320
(20) C.I. 59705

TABLE XI.—DEPTH OF COLOR RATINGS OF DELTA-AMINOBUTYLMETHYL-POLYSILOXANE-TREATED FIBERGLASS SUBSTRATA WITH THREE FAST DYE CLASSES
[Sulfur, vat and soluble vat esters]

| Dyestuff: | Percent dyestuff | Depth of color rating |
|---|---|---|
| (1) 53055 | 3 | 4 |
| (2) 53440 | 3 | 5 |
| (3) 53720/1 | 3 | 5 |
| (5) 59100/1 | 3 | 5 |
| (6) 59825/6 | 3, 5 | 4, 5 |
| (7) 73395/6 | 3, 5 | 3, 5 |
| (8) 73360/1 | 3 | 4 |
| (9) 69500/1 | 5 | 4 |
| (10) 73065/6 | 3 | 2 |
| (11) 59825/6 | 3 | 4 |
| (12) 70800 | 3 | 3 |
| (13) 71050 | 3 | 2 |
| (14) 59100 | 3 | 3 |
| (15) 59850 | 3 | 3 |
| (16) 73360/1 | 3 | 5 |
| (17) 69825 | 3 | 3 |
| (18) 73065/6 | 3 | 2 |
| (19) 70320 | 3 | 5 |
| (20) 59705 | 3 | 5 |

EXAMPLE XI

Silicious sand: Sulfur dyestuff

A sample of ordinary beach sand was treated with coloring assistant No. 9, and thereafter tested for colorability with a sulfur dyestuff. In this test, the aminoalkyl silicone treatment consisted of the following:

10.0 parts beach sand
5.0 parts coloring assistant No. 9
5.0 parts glacial acetic acid
0.1 part of a sodium alkyl sulfate wetting agent The foregoing mixture was stirred for 30 minutes at room temperature, filtered and dried at 300° F. for 10 minutes. A sample of the treated sand was then dyed with a sulfur dye according to the following procedure:

Dyestuff: A dye having a Color Index Number of 53720/1
Dye bath:
    0.5 gram of dyestuff
    10.0 grams of treated beach sand
    0.5 gram of sodium sulfide
    39.0 grams of water
    1.0 gram of $Na_2CO_3$
    2.0 grams of NaCl The dye and sodium sulfide were dispersed in water at room temperature. The sodium carbonate was added and the dye bath raised to 180° F. The treated sand was then added and the bath temperature raised to 195–200° F. After 15 minutes, the sodium chloride was added. Dyeing was continued for 45 minutes at 195–200° F. The dyed sand was then removed from the dye bath, rinsed in warm water, water and a sodium alkyl sulfate detergent, water alone, and dried.

A sample of untreated beach sand which was used as a control was absolutely uncolored, whereas the aminoalkylsilicone-treated sand which dyed with the sulfur dyestuff had a dark brown color very much like that of coarse ground coffee—a color of 5 on the basis of the color scale of Example I.

EXAMPLE XII

Synthetic and semi-synthetic organic fibers: miscellaneous normally non-affinitative dyestuffs Samples of Dynel fabric, acetate taffeta, spun Orlon, and Dacron challis were treated with padding solutions consisting of 5% of coloring assistant No. 9, 5% acetic acid and 90% water. After padding, the Dynel and acetate fabrics were dried at 250° F. for 5 minutes. The Dacron and Orlon were dried for 5 minutes at 300° F.

All of the treated samples were subsequently dyed with 3% dye concentrations of the following dyestuffs:

(1) A dye having a color index number of 53720/1
(2) A dye having a color index number of 59825/6
(3) A dye having a color index number of 59705
(4) A dye having a color index number of 24410

In each instance, the dye procedures were as previously described for dyeing glass fabric substrata. The results of these dyeings are tabulated in Table XII below on the basis of the color scale of Example I. As will be seen by reference to these data, medium to dark colors were produced with all of the dye classes.

TABLE XII.—DYEING OF AMINOALKYL SILICONE-TREATED (NO. 9) SYNTHETIC AND SEMI-SYNTHETIC ORGANIC FIBERS WITH NON-AFFINITATIVE DYESTUFFS

| Dyestuff | Fabric | Depth of color rating | |
|---|---|---|---|
| | | Untreated | Treated |
| Dye having a color index number of 24410 | Acetate | 0 | 2 |
| Do | Dacron | 0 | 3 |
| Do | Orlon | 0 | 3 |
| Do | Dynel | 0 | 4 |
| Dye having a color index number of 53720/1 | Acetate | 3 | 5 |
| Do | Dacron | 1 | 3 |
| Do | Orlon | 1 | 4 |
| Do | Dynel | 1 | 4 |
| Dye having color index number of 59705 | Acetate | 1 | 2 |
| Do | Dacron | 1 | 3 |
| Do | Orlon | 1 | 3 |
| Do | Dynel | 1 | 3 |
| Dye having a color index number of 59825/6 | Acetate | | 3 |
| Do | Dacron | | 4 |
| Do | Orlon | | 4 |
| Do | Dynel | | 4 |

EXAMPLE XIII

Dye affinity tests: Miscellaneous fabrics and non-affinitative acid dyestuff applied by normal dyeing techniques.

A series of tests were conducted with coloring assistant No. 1 at a 10% bath concentration to determine the ability of the aminoalkyl silicones to impart enhanced color affinity to various textile substrata towards normally non-affinitative dyestuffs. An acid dye, namely, a dye having a color index number of 63010, was selected for this study, and was used in conjunction with substrata samples of the following types:

Cotton             Acetate
Dacron           Viscose
Orlon              Glass
Dynel In all instances, the swatches of fabrics were treated with coloring assistant No. 1 and dried at 300° F. for 10 minutes. They were then dyed together with the selected acid dyestuff at a 2% (on fabric) concentration employing normal textile dyeing procedures. The dye bath further included 1% acetic acid and 10% of Glauber's salt. The bath ratio was 40:1. Dyeing was started at 120° F. and raised to 212° F. in 20 minutes and maintained at this temperature for 30 minutes longer. Acid was added and dyeing continued for 30 minutes more at 212° F. The dyed samples were rinsed at 160° F. and 120° F., followed by two cold water rinses, followed by press drying.

All of the samples demonstrated good dye affinity, but the depth of shade for a few was lighter than normal.

EXAMPLE XIV

Fiberglass cloth: Single bath pigment dyeing with aminoalkyl silicone-pigment dispersions Another series of fiberglass drapery fabric samples were subjected to single bath pigment dyeing operations with the following pigments:

A pigment having a color index number of 21090
A pigment having a color index number of 74260
A pigment having a color index number of 74160

The padding mixes were formulated as follows:

Percent
Pigment _____ 5
Coloring assistant No. 9 _____ 5
Acetic acid _____ 5

The swatches were padded through the three mixes and then dried for 10 minutes at 300° F. Portions of each sample were dry cleaned for 5 minutes in perchloroethylene. A second portion of each swatch was soaped-washed at 160° F. in an automatic washer. All samples were well colored both before and after the washing and dry cleaning.

EXAMPLE XV

Fiberglass cloth: Single bath dyeing with aminoalkyl silicone-dyestuff solutions In line with the excellent results obtained with single bath dispersions of insoluble pigments for dyeing fiberglass cloth, additional tests were conducted using the same technique in conjunction with soluble dyestuffs. The dyestuffs were either applied from acidic-aminoalkyl silicone solutions in water, or where the dyes were not miscible with these solutions, either and/or both water or alcohol solutions were employed. The following dye baths and dyeing procedures were employed in this series of dyeings:

(A) Vat dyestuff

|  | Percent |
|---|---|
| A vat dye having a color index number of 59825/6 | 3 |
| Coloring assistant No. 31 | 5 |
| Acetic acid | 5 |
| Water | 87 |

Here, the heat-clean glass fabric was padded through the coloring solution and then dried for 10 minutes at 300° F.

(B) Soluble vat ester dyestuff

|  | Percent |
|---|---|
| A soluble vat ester dye having a color index number of 59825/6 | 3 |
| Coloring assistant No. 31 | 5 |
| Acetic acid | 5 |
| Water | 87 |

In this dyeing, the glass cloth was handled as with the regular vat dye by padding and drying at 300° F. for 10 minutes. The fabric was then padded through 0.1% solution of sodium nitrite, followed by a 0.25% solution of sulfuric acid to oxidize the vat ester, followed by rinsing and drying.

(C) Sulfur dyestuff

|  | Percent |
|---|---|
| A sulfur dye having a color index number of 53720/1 | 3 |
| $Na_2S$ | 3 |
| Coloring assistant No. 31 | 5 |
| $H_2O$-methanol (50/50) | 89 |

The sulfur dye and sodium sulfide were dissolved in boiling water, then the solution was cooled to room temperature. The coloring assistant dissolved in methanol was added, and this solution was padded on the glass fabric and dried for 10 minutes at 300° F.

(D) Acetate "dispersed" dyestuff

|  | Percent |
|---|---|
| An acetate "dispersed" dye having a color index number of 62500 | 3 |
| Coloring assistant No. 31 | 5 |
| Methanol | 46 |
| Water | 46 |

(E) Pigment

|  | Percent |
|---|---|
| A pigment having a color index number of 74260 | 3 |
| Coloring assistant No. 31 | 5 |
| Acetic acid | 5 |

In each of the last two dyeings listed above (D and E) the glass cloth was padded through the silicone-dyestuff solution and dried at 300° F. for 10 minutes. In addition to the foregoing dyeings, another series of direct, cationic, acetate and acid dyeings was made using the following non-alcoholic acid solution.

(F-I)

|  | Percent |
|---|---|
| Dyestuff | 3 |
| Coloring assistant No. 31 | 5 |
| Acetic acid | 5 |
| Water | 87 |

Again, in this series the glass cloth was padded and dried 10 minutes at 300° F.

All of the glass fabrics as dyed in this series of dyeings were washed with soap at 160° F. in an automatic washer. Both the cationic-dyed fabric and the acetic dispersed-dyed fabric lost most of their color on washing, further confirming the previous conclusions that the cationic and dispersed dyestuffs are not amenable for use with the aminoalkyl silicone coloring assistants of my invention. The remaining anionic dye classes all showed excellent initial dyeing, and good to excellent durability on washing.

These experiments clearly establish that even the soluble dyestuffs may be applied from a single bath-type treating and coloring solution.

EXAMPLE XVI

Fiberglass cloth: Lightfastness tests

Swatches of heat-clean glass fabrics which had been colored with several different coloring agents and coloring assistant No. 9 were subjected to Fadeometer tests. In the tests, the samples were examined closely after each 10 hours of light exposure. The following results were found for the fabrics dyed with the coloring agents indicated:

A vat dye having a color index number of 59825/6: Did not fade in 100 hours

A vat ester dye having a color index number of 59825/6: Did not fade in 100 hours An acid dye having a color index number of 63010: Faded in 80 hours An acid dye having a color index number of 18050: Faded in 20 hours A direct and developed dye having a color index number of 22590: Faded in 20 hours The results of these Fadeometer testings indicate that the lightfastness of colored glass substrates prepared in accordance with the processing techniques of the invention is largely determined by the dye class involved. The pigments and vat colors, and selected dyes in other classes, can be chosen based on their usual known lightfastness to give the desired fastness properties.

EXAMPLE XVII

Polyethylene fabric: Pigment dyeing from single bath

Samples of a low-pressure polyethylene fabric were padded through the following coloring mixes:

|  | Percent |
|---|---|
| Pigment | 5 |
| Coloring assistant No. 32 | 5 |
| Acetic acid | 5 |

The following pigments were employed in these dyeings:

A pigment having a color index number of 21090
A pigment having a color index number of 74260
A pigment having a color index number of 74160

After padding three times at 40% wet pick-up, the samples were dried for 10 minutes at 220° F. Very brilliant even colors were obtained. The samples were also dry cleaned in perchlorethylene for 5 minutes, and washed in an automatic washer with a commercial soap. There was no loss of color on dry cleaning, but rather, it resulted in an enhancement with all three colors. Similar applications on the same fabric without the coloring assistant yielded poorer results in all cases.

The results of these dyeings are presented in tabulated form in Table XIII below on the basis of the color scale of Example I.

TABLE XIII.—COLORING OF POLYETHYLENE FABRIC

| Color used | Depth of color rating | | |
|---|---|---|---|
| | Initial | Dry cleaned | Washed |
| Pigment with CI of 74160 and Assistant 32 | 4 | 4 | 5 |
| Pigment with CI of 21090 and Assistant No. 32 | 4 | 4 | 5 |
| Pigment with CI of 74260 and Assistant No. 32 | 4 | 4 | 5 |

EXAMPLE XVIII

Fiberglass cloth: Lactic acid versus acetic acid as a solubilizing agent

This example shows the surprising benefits obtained by using lactic acid (as well as gluconic acid and diglycolic acid) as a solubilizing agent.

Samples of heat-cleaned fibed glass drapery cloth respectively were padded through dispersions containing 2 wt. percent pigment having a color index number of 74160, varying amounts of coloring assistant No. 17 and either lactic acid or acetic acid in the amounts as shown by the table below:

| | Dispersion | | | |
|---|---|---|---|---|
| | 1 | 2 | 3 | 4 |
| Coloring assistant, wt. percent | 1.0 | 2.0 | 3.0 | 5.0 |
| Acetic acid, 100%, wt. percent | 0.5 | 1.0 | 1.5 | 2.5 |

| | Dispersion | | | |
|---|---|---|---|---|
| | 5 | 6 | 7 | 8 |
| Coloring assistant, wt. percent | 1.0 | 2.0 | 3.0 | 5.0 |
| Lactic acid, 85% water solution, wt. percent | 0.5 | 1.0 | 1.5 | 2.5 |

The remainder of the dispersion (i.e., the amount required to make up to 100%) was water.

The fiber glass cloth was padded at 20% wet pickup. The cloth was dried and curved for three minutes at 400° F. After curing the colored cloth samples were tested by a soap wash test which involves placing 5″ x 5″ pieces of the colored cloth in an aqueous 0.5% neutral soap solution at 120° F. The colored cloth pieces are stirred in the soap solution for 5 minutes, after which they are rinsed in cold water and dried. Color removal is indicated by inspection of the sample piece and the soap solution. The following table shows the fastness to washing:

| Dispersion | 1 | 2 | 3 | 4 | 5 | 6 | 7 | 8 |
|---|---|---|---|---|---|---|---|---|
| Fastness | 4 | 4 | 4 | 3 | 3 | 2 | 2 | 1 |

*Fastness code.*—For the purposes of this example only, numbers from 1 to 4 have been assigned to rate the wash-fastness results. Fastness number 4 indicates substantial color loss from the cloth and substantial color gain by the soap solution. Fastness number 1 indicates no color loss by the cloth and no color gain by the soap solution. Fastness numbers 2 and 3 are proportionate intermediate gradations between fastness numbers 1 and 4.

The soap wash test employed in this example is a particularly severe test and represents a great many normal washings. All of the colored cloth pieces tested exhibited outstanding color retention when compared with fiberglass cloth pigmented by the best heretofore known method. It is to be noted moreover that those cloth pieces colored with the dispersion containing lactic acid exhibited an even greater superiority in color retention than the pieces colored by dispersions containing acetic acid. Colored cloth pieces colored by the process of this example were also tested for color retention after severe cleaning with solvents including those used in dry-cleaning. In these solvent tests all of the colored cloth pieces showed outstanding color retention over fiber glass cloths colored by heretofore known methods. It also was shown that the colored cloth pieces colored with the dispersions containing lactic acid retained color to a far greater degree than the pieces colored by the dispersions containing acetic acid. It is still further to be noted that when lactic acid is employed in the dispersion a lesser amount of coloring assistant is required for giving results equivalent to results obtained from the dispersions containing acetic acid.

When gluconic acid and diglycolic acid, respectively, are employed in place of and in the same amounts as the lactic acid, the same surprising benefits are obtained. In this regard lactic acid, gluconic acid and diglycolic acid function in an additional role other than the role of solubilizing agents. This additional role designates the appropriate classification of such acids as synergists, since the results of employing the coloring assistant and the acid (e.g. lactic, gluconic or diglycolic) are superior to results of employing either one without the other.

I have found many classes of synergists which when used in place of lactic acid in this example provide similar superior color retention after wet or dry-cleaning and improve the effectiveness of the coloring assistant. The following have been found to be synergists: water soluble epoxy compounds, e.g., vinylcyclohexene dioxide, diglycidyl ether of 1,4-butanediol (i.e. 1,4-diglycidoxybutane), the polyglycidyl ethers of glycerol and the like; water soluble amine-formaldehyde compounds and resins, e.g., trimethoxymethylmelamine, dimethylolethylene urea, methylol urea, dimethylol hydantoin, and the like; water soluble salts of di- and tribasic acid, e.g., the alums; methylolsteramide; ammonium zirconyl carbonate; melamine-formaldehyde stearamides, e.g., the reaction product of trimethoxymethylmelamine and methylolstearamide; the emulsion copolymers of acrylic resins, e.g., ethylacrylate-glycidyl-methacrylate copolymer, ethylacrylateitaconic-methyl methacrylate terpolymer, ethyl acrylate-vinyltriethoxysilane copolymer, ethyl acrylate-acrylamide copolymer and the like; ethyleneimine compounds, e.g., triethyleneimine phosphine oxide

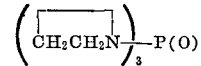

and the like; alkylolphosphonium halides, e.g., tetramethylolphosphonium chloride [ClP(CH$_2$OH)$_4$].

These synergists, including lactic acid, glyconic acid, diglycolic acid and those previously mentioned, also provide similar superior results when added to dye baths such as those described herein as obtained when added to pigment dispersions such as those described in this example.

The synergist can be added to the pigment dispersion or dye bath along with the coloring asistant or it may be applied to the colored cloth after treatment with the pigment dispersion or dye bath.

In some instances the synergist will spontaneously react with the coloring assistant when aded to the dispersion or dye bath simultaneously with said coloring assistant. In such instances it is preferable to apply the synergist at a time subsequent to treatment with the pigment dispersion or dye bath.

Having thus described the subject matter of my invention, what it is desired to secure by Letters Patent is:

1. In a process for coloring solid, fibrous and pulverulent substrate materials with a coloring agent selected from the group consisting of anionic dyestuffs and pigment colors, the improvement that comprises promoting enhanced affinity of the substrate material for the coloring agent by applying to the substrate an aminoalkyl silicone coloring assistant selected from the group consisting of monomeric aminoalkylsilanes, aminoalkylpolysiloxanes, copolymers of aminoalkylpolysiloxanes with at least one other polysiloxane free of aminoorgano groups, such aminoalkyl silicone coloring assistant contains one amino substituent for each aminoalkyl group therein and the nitrogen atom of the amino is connected to a silicon atom of the silicone directly through a divalent hydrocarbon radical and the amino nitrogen atom is separated by at least three carbon atoms from the silicon atom.

2. The process of claim 1 wherein the substrate material is fiber glass.

3. The process of claim 1 wherein said aminoalkyl silicone coloring assistant contains the functional grouping of the formula:

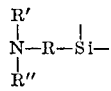

wherein R is a divalent hydrocarbon linkage of at least three carbon atoms chain length in which the amino nitrogen is substituted at least three carbon atoms removed from silicon; R' and R" represent members selected from the group consisting of hydrogen, alkyl, cyanoalkyl, hydroxyalkyl, carboxyalkyl, carboalkoxyalkyl, aryl radicals and silylhydrocarbyl.

4. The process of claim 3 wherein the aminoalkyl silicone coloring assistant is delta-aminobutyl-methyl-polysiloxane.

5. The process of claim 1 wherein said aminoalkyl silicone coloring assistant is applied to the substrate material from an aqueous solution containing a monobasic organic acid.

6. A solid, fibrous or pulverulent material colored with a coloring agent selected from the group consisting of anionic dyestuff and pigment colors and having provided thereon an aminoalkyl silicone coloring assistant selected from the group consisting of monomeric aminoalkyl silanes, aminoalkylpolysiloxanes, copolymers of aminoalkylpolysiloxanes with at least one other polysiloxane free of aminoorgano groups, such aminoalkyl silicone coloring assistant contains one amino substituent for each aminoalkyl group therein and the nitrogen atom of the amino is connected to a silicon atom of the silicone directly through a divalent hydrocarbon radical and the amino nitrogen atom is separated by at least three carbon atoms from the silicon atom.

References Cited
UNITED STATES PATENTS

| | | | |
|---|---|---|---|
| 2,715,133 | 8/1955 | Speier | 260—448.2 |
| 2,778,746 | 1/1957 | Steinman | 117—126 |
| 2,832,754 | 4/1958 | Jex | 260—448.2 |
| 2,849,333 | 8/1958 | Kingsbury | 117—126 |
| 2,436,304 | 2/1948 | Johannson | 117—124 |
| 2,927,839 | 3/1960 | Bailey | 8—8 |
| 2,865,918 | 12/1958 | Hurwitz et al. | 8—74 |
| 2,971,864 | 2/1961 | Speier | 117—126 |
| 2,990,230 | 6/1961 | Beasley | 8—62 |

OTHER REFERENCES

Union Carbide, pub. by Silicones Div. of Union Carbide and Carbon Corp., October 1956, pp. 1–16.

American Dyestuff Reporter, Nov. 28, 1949, pp. 841–853.

DONALD LEVY, Primary Examiner

U.S. Cl. X.R.

8—7, 8, 31, 100, 168, 163, 30, 173, 166; 117—124, 138, 8, 7; 8—37, 39, 34, 38, 165, 46, 21, 97, 12, 17; 117—145, 75, 76, 128, 4, 123, 132

UNITED STATES PATENT OFFICE
CERTIFICATE OF CORRECTION

Patent No. 3,545,909     Dated December 8, 1970

Inventor(s) Domenick D. Gagliardi

It is certified that error appears in the above-identified patent and that said Letters Patent are hereby corrected as shown below:

Column 2, line 33, delete second appearing comma after "cloth' line 40, "vairous" should read --various--. Column 3, line 6: "printing" should read --spinning--; line 65, "difficult" shou read --difficultly--. Column 4, line 37, "pressure" should r --presence--. Column 6, line 7, "concentratitions" should re --concentrations--; line 34, "soluion" should read --solution Column 7, line 29, "proces" should read --process--. Column 1( line 8, "ionexchange" should read --ion-exchange--; line 16, "H₂ 0" should read --H₂O--. Column 11, line 47, "nit" shoul read --not--. Column 13, line 20, "deltaaminobutylmethylpoly siloxane" should read --delta-aminobutylmethylpolysiloxane--. Column 15, line 2, "pro-" should read --pri- --. Column 22, line 37, after "of" insert --a--; line 40, "hydro" should rea --Hydro--. Column 23, line 28, "corloring" should read --coloring--; line 36, "diflerent" should read --different--; line 67, "22.590" should read --22590--. Column 25, line 1, "developed" should read --develop--; line 59, "conventration" should read --concentration--; line 69, "bettter" should read --better--; line 74, "difficulty" should read --difficultly-- Column 26, line 10, "Naphtho₁" should read --Naphthol--; line last column of numbers under "Naphtho₁" are all incorrect and should read in sequence --1, 3, 4, 3, 3, 4, 3, 2, 2, 2, 1--; line 19, the "4" under "Naphtho₁" relative to No. 1 should re --1--; line 72, "batth" should read --bath--. Column 27, lin 23, "are" should read --were--. Column 28, line 11, "in" should read --on--; line 27, "(2)C.I.5440" should read --(2)C.I.53440--.

Column 29, line 52, after "which" insert --was--. Column 30, line 20, column of numbers under "Treated", the figure "3" is

UNITED STATES PATENT OFFICE
CERTIFICATE OF CORRECTION

Patent No. 3,545,909          Dated December 8, 1970

Page - 2

Inventor(s) Domenick D. Gagliardi

It is certified that error appears in the above-identified patent and that said Letters Patent are hereby corrected as shown below:

backwards. Column 33, line 21, "fibed" should read --fiber-- line 41, "curved" should read --cured--. Column 34, line 54, "aded" should read --added--.

Signed and sealed this 1st day of October 1974.

(SEAL)
Attest:

McCOY M. GIBSON JR.          C. MARSHALL DANN
Attesting Officer          Commissioner of Paten